(12) United States Patent
Yabe et al.

(10) Patent No.: US 6,572,269 B2
(45) Date of Patent: Jun. 3, 2003

(54) BEARING APPARATUS

(75) Inventors: Toshikazu Yabe, Kanagawa (JP); Takahiko Uchiyama, Kanagawa (JP); Keisuke Yokoyama, Kanagawa (JP); Nariaki Aihara, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/996,792

(22) Filed: Nov. 30, 2001

(65) Prior Publication Data

US 2002/0154838 A1 Oct. 24, 2002

(30) Foreign Application Priority Data

Nov. 30, 2000 (JP) .................................... 2000-366098
Dec. 12, 2000 (JP) .................................... 2000-377520
Apr. 10, 2001 (JP) .................................... 2001-111642

(51) Int. Cl.$^7$ .............................................. F16C 33/78
(52) U.S. Cl. ..................... 384/15; 384/484; 74/424.82
(58) Field of Search ........................ 384/15, 484, 485, 384/486, 607; 74/424.82

(56) References Cited

U.S. PATENT DOCUMENTS 5,695,198 A * 12/1997 Iwamoto et al. ............. 384/482
6,471,409 B2 * 10/2002 Nakamura ................... 384/484

FOREIGN PATENT DOCUMENTS

JP          11-193795 A          7/1999

* cited by examiner

Primary Examiner—Lenard A. Footland
(74) Attorney, Agent, or Firm—Sughrue Mion, PLLC

(57) ABSTRACT

A linear guide apparatus includes a slider, a guide rail opposing the slider with a clearance provided therebetween, a plurality of rolling elements which are rotatably interposed there between, and a contact seal device for sealing an opening of the clearance. A side seal member of the contact seal device is made of a rubber material composition containing fluoro rubber. The rubber basically comprises at least one of copolymers that are vinylidenefluoride-tetrafluoroethylene-polypropylene terpolymer and tetrafluoroethylene-polypropylene copolymer.

12 Claims, 9 Drawing Sheets

BEARING APPARATUS

BACKGROUND OF THE INVENTION

The present invention relates to a bearing apparatus comprising: a first member; a second member; rolling elements rotatably interposed between the first and second members to thereby effect relative movement therebetween; and a seal device for sealing at least a portion of a clearance defined between the first and second members.

Particularly, a first aspect of the present invention relates to a linear motion apparatus, which is one example of the bearing device, such as a linear guide apparatus and a ball screw apparatus, and more particularly to an improvement in a contact rubber seal device serving as a seal device.

A second aspect of the present invention relates to a water pump bearing, which is one example of the bearing apparatus and is suitable for use with a water-cooled automobile engine, and more particularly to a bearing having a seal device for preventing entry of water or moisture into a bearing supporting a rotary shaft of a water pump and preventing leakage of grease from the inside of the bearing.

A third aspect of the present invention relates to a rolling bearing, which is an example of the bearing apparatus, and more particularly to an improvement in a rubber seal device to be used in the bearing apparatus.

For instance, a linear guide apparatus to be used as a linear motion guide apparatus and a ball screw apparatus to be used as a linear motion drive apparatus have hitherto been known as typical ones of linear motion apparatus.

As shown in FIG. 10, the linear guide apparatus is equipped with a guide rail (functioning as interior member) 1 extending in its longitudinal direction; and a slider 2 (functioning as exterior member) sliding on the guide rail 1 so as to be movable in an axial direction while a predetermined clearance is provided between the slider 2 and the guide rail 1.

A pair of rolling-element contact grooves 3 are formed on either side surface of the guide rail 1 so as to extend in the axial direction thereof. A pair of linear rolling-element contact grooves (not shown) opposing the rolling-element contact grooves 3 are formed in the interior surface of each wing 4 provided on either side of a slider main body 2A of the slider 2.

A plurality of steel balls (not shown) serving as rolling elements are rotatably provided between the rolling-element grooves 3 formed in the guide rail 1 and the counterpart grooves formed in the slider 2, which mutually oppose. The slider 2 can travel along the guide rail 1 in the axial direction by means of rolling action of the steel balls. As the slider 2 travels, the steel balls interposed between the guide rail 1 and the slider 2 rotate and shift to the end of the slider main body 2A of the slider 2. In order to continuously move the slider 2 in the axial direction, an infinite number of steel balls must be circulated.

To this end, linear rolling-element channels (not shown) are formed so as to axially penetrate through each of the wings 4 of the slider main body 2. An end cap 2B serving as a rolling-element circulating component is provided at either longitudinal end of the slider main body 2A. A rolling-element circulation R section having a semi-circular-shaped curve is formed in each end cap 2B so as to establish mutual communication between the rolling-element grooves and the rolling-element passages, thus constituting an endless rolling-element circulation railway.

As shown in FIG. 11, a side seal member 5 (a contact seal having negative clearance with respect to the guide rail 1) is attached to either end of the slider 2 for sealing an opening of a clearance defined between the guide rail 1 and the slider 2. An underseal member 6 is affixed to the underside of the slider 2.

Rubber material such as acrylonitrile butadiene (NBR) is commonly used for the seal members 5, 6 and is formed integrally with reinforcing material, such as a steel plate. Particularly, when the seal member requires chemical resistance or heat resistance, fluoro rubber [such as FKM; vinylidenefluoride-hexafluoropropylene-based fluoro rubber or vinylidenefluoride-hexafluoropropylene-tetrafluoroethylene-based fluoro rubber] is often used as rubber material. In the drawing, reference numeral 7 indicates a grease nipple.

Although not shown in the drawing, a ball screw apparatus, which is a linear motion apparatus, converts rotation of a screw shaft (or ball screw nut) into axial displacement of a ball screw nut (or screw shaft), through a plurality of balls (rolling elements) interposed between a helical screw groove formed in the outer circumferential surface of a screw shaft (inner member) and a helical screw groove formed in an inner circumferential surface of a ball screw nut (outer member). For example, a plastic seal member is attached as a contact seal device to either end of the ball screw nut, thereby preventing entry of extraneous matter into the ball screw nut from the outside or leakage to the outside of a lubricant from the inside of the ball screw nut.

The contact seal device is usually formed of resin material, such as polyacetal resin, into the shape of a ring. A thread to engage with the screw thread of the screw shaft is formed on an interior diameter section of the contact seal device, and a notch (discission) is formed in the contact seal device for radially cutting.

The notch is opened to open the ring widely, and the thus-opened contact seal device is fitted around the screw shaft. A lockscrew is screwed into a ball screw nut from an outer circumferential surface at the end thereof. The outer-diameter surface of the contact seal device is pressed inwardly, whereby the contact seal device is secured to the end of the ball screw nut.

However, the contact seal device employed in the related-art linear guide apparatus and that employed in the related-art ball screw apparatus involve the following problems.

First, a problem of the contact seal device employed in the linear guide apparatus will be described. The rotating speed of a main spindle of a machine tool employing a linear guide apparatus has recently been increased. In connection with a tool, a dramatic leap has been achieved in development of highly heat resistant material or a coating technique, in an attempt to increase the speed and efficiency of cutting work. In association with such a development, a synthetic cutting coolant of soluble type, which can be subjected to sewage processing by means of complete dissolution into water, has come to replace a related-art water-soluble cutting fluid of emulsion type, in order to make full use of all the capabilities of the cutting fluid. Namely, a cooling property for absorbing a large quantity of heat developing in the vicinity of a cutting point, permeability for reaching a cutting point momentarily, and lubricity at a high-temperature, high-pressure cutting point.

The major feature of the soluble-type synthetic cutting coolant lies in that a large number of various types of additive agents, such as amine, are added to the coolant in order to improve permeability. Hence, the coolant is highly permeable to rubber material, and the rubber material is susceptible to deformation, such as expansion or softening. Consequently, the rubber strength of a slide member (e.g., a rubber lip section) of the contact seal device belonging to the linear guide, which apparatus is used in an environment in which the apparatus is splashed with a soluble-type synthetic cutting coolant, becomes weak. Concurrently, a region of the seal member to be fastened becomes greater, and as a result abrasion of the seal member is accelerated. This results in a drop in sealing property of the seal member, which may deteriorate the life of the linear guide apparatus.

Particularly, when the rubber material of the seal member is made of FKM (i.e., vinylidenefluoride-hexafluoropropylene-based fluoro rubber or vinylidenefluoride-hexafluoropropylene-tetrafluoroethylene-based fluoro rubber), an amino-based additive is considered to induce removal of HF (hydrogen fluoride) at a plurality of sites of vinylidene fluoride which are present in a structure of FKM, thereby deteriorating the rubber material and reducing the rubber strength of the seal member.

In the ball screw apparatus, a ring-shaped seal device is usually secured to a ball screw nut by means of a lockscrew. Hence, the clearance of engagement between the screw groove of the screw shaft and a projection of the seal device depends on a dimensional relationship between the screw groove of the screw shaft and the seal device. Hence, the clearance of engagement does not become zero at all times. Depending on the requirements for use of the ball screw apparatus, a sufficient sealing characteristic may not be obtained. Consequently, extraneous matter, such as cutting dust, becomes more likely to enter the ball screw nut, potentially causing seizing up of the ball screw apparatus.

If a rubber seal member is used in place of the plastic seal member, as in the case of the contact seal device of the linear guide apparatus, in order to improve the sealing property of the ball screw apparatus, the same problems as those that have arisen in the linear guide apparatus are considered to occur.

The first aspect of the present invention has been conceived to solve the problems.

Hereinafter, one of typical examples of a conventional bearing device for a water pump will be hereinafter explained.

As shown in FIG. 12, a water pump 130 for circulating engine cooling water through compression usually comprises a rotating shaft 112 having an impeller 132 secured thereon, and the rotating shaft 112 is supported in a casing 138 by means of a plurality of rolling bearings 110 spaced apart from each other in the axial direction. The cooling water is hermetically sealed by a mechanical seal 140 provided between the impeller 132 and the bearings 110. The surfaces of the bearings 110 for water pump (often called simply as "bearings") remaining sliding contact with the rotating shaft 112 of the mechanical seal 140 are in a water lubricated state. In this state, steam will leak and enter the bearings 110, and the bearings 110, 110 are deteriorated by the steam. A seal device is provided on the part of the bearing 110 opposing the impeller 132 for preventing entry of steam into the bearing 110 from the impeller 132 and leaking of lubrication grease sealed in the bearing 110. Another seal device is also provided on the part of the bearing 110 opposing a driven side 131 for preventing entry of dust from the outside and leaking of the lubrication grease sealed in the bearing 110.

For instance, the seal device provided on the part of the bearing 110 opposing the impeller 132 has a structure shown in an axial cross-sectional view of FIG. 13. As shown in FIG. 13, the bearing 110 comprises an outer ring 110a; a rotating shaft 112 constituting an inner ring; balls 110b sandwiched between the outer ring 110a and the rotating shaft 112; and a retainer 110c for holding the balls 110b. A seal device 400 comprises a sealing plate 115 and a thrower 120. The sealing plate 115 is provided in a seal groove 110d formed in the axial end portion of the outer ring 110a. The sealing plate 115 comprises a core 115a and elastic material 115b, and the resilient member 115b comprises three lip sections 115c, 115d, and 115e. The core 115a has a reversed L-shape cross-sectional profile and is squeezed into the seal groove 110d of the outer ring 110a. The elastic material 115b is provided in intimate contact with the outer surface of the core 115a. The elastic material 115b is made of nitril rubber or standard fluoro rubber having superior heat resistance (e.g., vulcanizable fluoro rubber composition containing vinylidenefluoride-hexafluoropropylene copolymer or vinylidenefluoride-hexafluoropropylene-tetrafluoroethylene terpolymer). The elastic material 115b has a bifurcated cross sectional profile. A main lip section 115e constituting one of the bifurcated portion obliquely extends in the lower right direction, and a sub-lip section 115d constituting the remaining of the bifurcated portion obliquely extends in the lower left direction. A cylindrical third lip section 115c is formed in the middle of the core 115a so as to extend from the elastic material 115b in the right direction in the drawing.

The stainless thrower 120 is provided on the rotating shaft 112. The thrower 120 comprises a small cylinder 120c to be closely fitted to the rotating shaft 112; a large cylinder 120a concentrically enclosing the small cylinder 120c, and a flange 120b interconnecting the small cylinder 120c and the large cylinder 120a with in the radial direction. The third lip section 115c of the elastic material 115b is in contact with the outer periphery of the large cylinder 120a of the thrower 120, thereby constituting a hermetic seal. The main lip section 115e is in contact with the outer periphery of the small cylinder 120c, thereby constituting a hermetic seal. The sub-lip section 115d is in contact with the outer circumferential surface of the rotating shaft 112, thus constituting a hermetic seal.

When steam or water droplets of cooling water have splashed over the seal device 400 from the outside, the outer circumferential surface of the thrower 120 receives the steam or water droplets, thereby protecting the seal plate 115 from a splash of cooling water. In this way, expansion or deformation of the sealing plate 115 (particularly the third lip member 115c) can be diminished. In contrast, the grease sealed in the bearing 110 is sealed by the sub-lip section 115d and the main lip section 115e of the sealing plate 115, thereby preventing leakage of grease to the outside.

In association with a recent increase in performance and output of an engine, temperature conditions of the engine become more harsh. In some cases, the ambient temperature of the bearing exceeds 120° C. or thereabouts. When nitril rubber is used as elastic material of the seal device of the bearing 110, a resilient material becomes hard and deteriorated by means of heat, thus losing elasticity. In the worst case, cracks arise in the lip section, which may deteriorate the sealing performance of the seal device. A limit of heat resistance of standard fluoro rubber is 200° C. or higher. Even the above-described temperature conditions pose no problem in heat resistance. However, if the fluoro rubber comes into contact with an additive contained in the cooling water, the rubber may be deteriorated and deformed, thus losing sealing performance.

As elastic material for a seal device of a related-art water pump bearing, hydrogenated nitril rubber described in Japanese Patent Unexamined Publication No. Hei. 11-193795 has hitherto been known. Since the limit of heat resistance of hydrogenated nitril rubber is 150° C., the rubber poses no problem even under the foregoing temperature conditions. However, the nitril rubber becomes deformed upon contact with an additive contained in cooling water, although the rubber is deformed less than standard fluoro rubber. Hence, the sealing performance of the seal device may decrease. Hence, the performance of the hydrogenated nitril rubber cannot be said to be sufficient.

The second aspect of the present invention aims at solving the problem.

Hereinafter, one typical example of a conventional rolling bearing will be explained.

A rubber seal, which is integrally formed from rubber such as acrylonitrile butadiene (NBR) or acrylic rubber and a metal reinforcing member such as a steel plate, has hitherto been usually used as a rubber seal device for a rolling bearing. Particularly in a case where chemical resistance or heat resistance is required, common fluoro rubber (FKM); e.g., vinylidenefluoride-hexafluoropropylene-based fluoro rubber or vinylidenefluoride hexafluoropropylene-tetrafluoroethylene-based fluoro rubber, is often used.

However, the related-art rolling bearing yields the following problems associated with a rubber seal device.

The rotating speed of a main spindle of a machine tool employing a number of pieces of rolling bearing has recently been increased. In connection with a tool, a dramatic leap has been achieved in development of highly heat resistant material or a coating technique, in an attempt to increase the speed and efficiency of cutting work. In association with the development, a cutting point is increased to a higher temperature. Hence, demand exists for cutting oil having higher cooling performance and permeability for reaching a cutting point momentarily.

In order to make full use of the capabilities of the cutting fluid, such as lubricity at a high-temperature, high-pressure cutting point, a synthetic cutting coolant of soluble type, which is completely dissolved into water, has come to replace a related-art water-soluble cutting fluid of emulsion type. The soluble-type cutting coolant is advantageous even in terms of ease of disposal of wastewater.

A large quantity of various types of additive agents, such as amine, are added to the soluble-type synthetic cutting coolant in order to improve permeability. Hence, when the coolant has come into contact with a rubber seal device, the rubber material is susceptible to deformation, such as expansion or softening. Consequently, the rubber strength of a lip section of the contact seal device becomes weak. Particularly, a lip section of contact type is greatly affected, and a region of the seal member to be fastened becomes greater. As a result, abrasion of the seal member is accelerated, resulting in a deterioration in sealing property of the seal member, which may shorten the life of the rolling bearing. Particularly, when the rubber material of the seal member is made of FKM, an amine-based additive easily induces removal of HF (hydrogen fluoride) at a plurality of sites of vinylidene fluoride which are present in a structure of KM, thereby deteriorating the rubber material and reducing the rubber strength of the seal member.

A large quantity of amine-based additive is used in an automobile coolant or the like, and similar problems are expected to arise.

A compound constituting the amine-based additive is contained in thermal decomposition products which are gradually produced when urea-based grease is used at high temperatures. Hence, even in a situation in which an amine-based additive is used as a coolant-and does not come into contact with a rolling bearing, if urea-based grease is sealed, similar problems may arise.

The third aspect of the present invention has been conceived in view of the foregoing situation.

SUMMARY OF THE INVENTION

It is an object of the present invention to solve at least one of the above-mentioned problems in the conventional techniques.

The object of the present invention can be achieved by a bearing apparatus comprising:

a first member;

a second member;

rolling elements rotatably interposed between the first and second members to thereby effect relative movement therebetween; and a seal device for sealing at least a portion of a clearance defined between the first and second members, the seal device comprising a rubber portion made of fluoro rubber composition containing at least one of vinylidenefluoride-tetrafluoroethylene-polypropylene copolymer (terpolymer) and tetrafluoroethylene-polypropylene copolymer (bipolymer).

In an embodiment of the above-mentioned bearing apparatus, it is preferable that the bearing apparatus is a linear motion apparatus, the first member is a guide rail or screw shaft of the linear motion apparatus, and the second member is a slider or nut of the linear motion apparatus.

Further, in an embodiment of the above-mentioned bearing apparatus, it is preferable that the bearing apparatus is a rolling bearing, the first member is an outer ring of the rolling bearing, and the second member is an inner ring of the rolling bearing.

In an embodiment of the above-mentioned bearing apparatus, it is preferable that the seal device further comprises:

a reinforcing member integrally formed with the rubber portion.

Moreover, in an embodiment of the above-mentioned bearing apparatus, it is preferable that the bearing apparatus is a water pump bearing, the first member is an outer ring secured on a casing of the water pump bearing, the second member is a rotary shaft having a drive section at one end thereof and an impeller at the other end thereof, and the seal device is fastened to one end of the outer ring.

In addition, in an embodiment of the above-mentioned bearing apparatus according to the present invention, it is preferable that the at least one of vinylidenefluoride-tetrafluoroethylene-polypropylene terpolymer and tetrafluoroethylene-polypropylene copolymer is vulcanizable.

It is an object of the first aspect of the present invention to provide a linear motion apparatus which has high chemical resistance against a chemical such as soluble-type synthetic coolant containing-a large quantity of amine-based additive and which can ensure a long life even when used in a splash of the chemical.

In order to achieve the object, the first aspect of the present invention provides a linear motion apparatus comprising: an exterior member; an interior member disposed so as to oppose the exterior member through a clearance; a plurality of rolling elements which are rotatably interposed between the exterior and interior members and cause the exterior member to move relative to the interior member; and a seal device for sealing an opening of the clearance, wherein a seal member of the contact seal device is constituted of a fluoro rubber composition basically comprising at least one of copolymers that is vinylidenefluoride-tetrafluoroethylene-polypropylene terpolymer or tetrafluoroethylene-polypropylene copolymer.

The fluoro rubber composition according to the present invention comprises various additives, such as various types of fillers, a vulcanized additive, and processing aids, in addition to a rubber stock; that is, vinylidenefluoride-tetrafluoroethylene-polypropylene terpolymer or tetrafluoroethylene-polypropylene copolymer. The rubber material composition is preferably used as a material for the seal device.

In order to manufacture a rubber feedstock; that is, vinylidenefluoride-tetrafluoroethylene-polypropylene terpolymer or tetrafluoroethylene-polypropylene copolymer, there can be adopted any of various polymerization methods, such as a bulk polymerization method, a suspension polymerization method, an emulsion polymerization method, and a solution polymerization method. Any one of a catalytic polymerization method using a free radical initiator, an ionizing radiation polymerization method, and a redox-based polymerization method is adopted, as required.

In order to facilitate vulcanization of vinylidenefluoride-tetrafluoroethylene-polypropylene terpolymer by an organic peroxide, a carbon-carbon double bond may be introduced to the principal chain of a polymer, acting as a polymerization site, through removal of hydrogen fluoride; or iodine-containing or bromine-containing monomer may be copolymerized with the principal chain of the polymer. Since the rubber feedstock contains a vinylidene fluoride site, the rubber feedstock acquires a good vulcanization characteristic without introduction of the vulcanization site, which would usually be effected for vulcanizing an organic peroxide, so long as at least either a di-metal-hydride or a di-metal-oxide, and an organic onium compound are mixed with the rubber feedstock. Thus, a vulcanized material having superior physical properties can be produced.

Desirable proportions in which three monomers are to be polymerized comprise 1 to 30 mol. % vinylidene fluoride (more preferably, 2 to 5 mol. % vinylidene fluoride), 40 to 70 mol. % tetrafluoroethylene, and 30 to 60 mol. % polypropylene. Resistance to a chemical, such as amine, and a vulcanization characteristic are greatly dependent on a proportion of polymerization of vinylidene fluoride. In view of a vulcanization characteristic, a larger proportion of vinylidene fluoride is preferable. However, an excessive proportion of vinylidene fluoride results in corresponding deterioration of chemical resistance. If chemical resistance is pursued at the expense of the vulcanization characteristic, a desirable proportion of vinylidene fluoride is 2 to 5 mol. %.

Vinylidene fluoride does not exist in the structure of tetrafluoroethylene-polypropylene copolymer. Hence, tetrafluoroethylene-polypropylene copolymer is inferior to vinylidenefluoride-tetrafluoroethylene-polypropylene terpolymer in terms of a vulcanization characteristic. However, iodine-containing or bromine-containing monomer is copolymerized with the polymer so that an organic peroxide can be vulcanized. Hence, vulcanization of tetrafluoroethylene-polypropylene copolymer becomes feasible.

Desirable proportions of copolymerization of tetrafluoroethylene-polypropylene copolymer comprise 40 to 70 mol. % tetrafluoroethylene, and 30 to 60 mol. % polypropylene.

As a filler for reinforcing purpose, 20 to 70 parts by weight of carbon black, talc, wollastonite, or Mistron Paper is preferably added to 100 parts by weight of rubber feedstock. Since silica and clay are acidic and cause delay in vulcanization, they are not preferable.

An organic peroxide is used as a vulcanizing agent. More specifically, dicumyl peroxide, 2,5-dimethyl-2,5-di-(t-butylperoxy) hexane, benzoyl peroxide, or 1,3-bis-(t-butylperoxy)-diisopropylbenzene is preferably added in an amount of 0.5 to 10 parts by weight to 100 parts by weight of rubber feedstock. In the case of vinylidenefluoride-tetrafluoroethylene-polypropylene terpolymer, polyamine vulcanization or polyol vulcanization is a possible alternative to peroxide vulcanization by an organic peroxide.

Unsaturated multifunctional compounds are used as a vulcanizing agent. More specifically, polyallyl compounds such as triallyl isocyanurate or triallyl cyanurate, or methacrylate compounds such as trimethylolpropanetrimethacrylate are preferably added in an amount of 0.5 to 10 parts by weight to 100 parts by weight of rubber feedstock.

In the case of vinylidenefluoride-tetrafluoroethylene-polypropylene terpolymer, hydrides and oxides, such as those of magnesium, calcium, lead, and zinc, can be mentioned as di-metal-hydride or di-metal-oxide to be used as a vulcanizing agent. Preferably, the hydride or oxide is added in an amount of 1 to 20 parts by weight to 100 parts by weight of rubber feedstock.

In the case of vinylidenefluoride-tetrafluoroethylene-polypropylene terpolymer, an organic onium compound to be added as a vulcanizing agent promotes reaction for removing hydrogen fluoride from rubber during vulcanization, thus effecting smooth vulcanization of rubber. Particularly, fatty acid quaternary ammonium hydrogensulfate having a carbon number of 1 through 20 is preferable. More specifically, there can be mentioned tetrabutylammonium hydrogensulfate, tetramethylammonium hydrogensulfate, tetraethylammonium hydrogensulfate, tridecylmethylammonium hydrogensulfate, or trimethylbenzylammonium hydrogensulfate. Preferably, the hydrogensulfate is added in an amount of 0.3 to 5 parts by weight to 100 parts by weight of rubber feedstock.

In relation to the hardness of a rubber material composition according to the present invention, the spring hardness measured by a duro-meter A scale preferably falls within a range of 60 to 90, in terms of a sealing and follow-up property obtained when the rubber material composition is applied to the contact seal device. If the spring hardness assumes a value of less than 60, the rubber lip section of the seal member of the contact seal device becomes deformed to a greater extent than required when the slider of the linear guide apparatus or the ball screw nut of the ball screw apparatus linearly travels back and forth. As a result, frictional resistance often becomes greater. This sometimes increases frictional force experienced at the time of movement of the slider or the ball screw nut, thereby hindering smooth reciprocal movement of the slider or ball screw nut.

In contrast, when the spring hardness exceeds a value of 90, rubber elasticity decreases, thereby deteriorating a follow-up characteristic or sealing characteristic of the rubber lip section of the seal member during reciprocal movement. When the contact seal device is used in an environment rich in extraneous matter, the contact seal device is susceptible to disparities in life.

In order to make the degree of deformation or rubber elasticity of the rubber lip section particularly preferable, the spring hardness of the rubber material composition is set so as to fall within a range of 70 to 80.

In order to cause the contact seal device to quickly follow reciprocal movement of a movement section of the linear motion apparatus and to prevent occurrence of damage to the rubber lip section, the rubber material composition preferably has, along with the hardness specified above, a tensile breaking elongation of 200% or more and a tensile breaking strength of 13 Mpa or more as a mechanical strength.

A linear motion apparatus equipped with a contact seal device using the rubber material composition according to the present invention may have a lubricant supply member which is to be disposed in proximity to the contact seal device and is composed of lubricant-containing polymer.

The lubricant-containing polymer is formed from synthetic resin selected from a polyolefin-based resin group comprising polyethylene, polypropylene, polybutene, and polymethylpentene, which have essentially identical chemical constructions. A feedstock is formed by means of adding, to the synthetic resin and as a lubricant, paraffin-based hydrocarbon oil such as a poly-α-olefin oil, a naphthene-based hydrocarbon oil, mineral oil, ether oil such as dialkyl phenyl ether oil, or ester oil such as ester-phthalate, solely or in combination. The feedstock is heated to a melting point of resin or higher until it becomes plasticized. The thus-plasticized feedstock is cooled into a solid form. Various additives, such as an oxidation inhibitor, a rust inhibitor, an abrasion inhibitor, a defoaming agent, and an extreme-pressure agent, may be added to the lubricant beforehand.

A composition ratio of lubricant-containing polymer comprises 10 to 50 wt. % polyolefin-based resin and 90 to 50 wt. % lubricant with respect to the total weight of the polymer. When polyolefin-based resin assumes a value of less than 10 wt. %, hardness or strength of a certain level or higher cannot be attained. Hence, there arises an increase in the possibility of a problem, such as damage, occurring when load is imposed on the contact seal device as a result of actuation of the linear motion apparatus. When polyolefin-based resin exceeds 50 wt. % or more (i.e., when a lubricant accounts for less than 50 wt. %), supply of a lubricant to the rubber lip section is lessened, thereby diminishing an effect of reducing abrasion of the rubber lip section The group of synthetic resin has the same basic construction but changes in mean molecular weight within the range of 700 to $5 \times 10^6$. Synthetic resin having a mean molecular weight of 700 to $1 \times 10^4$ (e.g., polyethylene wax), synthetic resin having a comparatively-low molecular weight of $1 \times 10^4$ to $1 \times 10^6$, and synthetic resin classified into a wax having a ultrahigh molecular weight of $1 \times 10^6$ to $5 \times 10^6$ are used solely or in combination, as required. Through combination of synthetic resin of comparatively low molecular weight with a lubricant, there is produced lubricant-containing polymer having a certain level of mechanical strength, lubricant supply capability, and an oil retaining characteristic.

When some of the synthetic resin of comparatively low molecular weight are replaced with synthetic resin to be classified into a wax, an affinity for lubricating oil is increased, because of a small difference between the synthetic resin to be classified into a wax and the lubricating oil. Consequently, the oil retaining characteristic of the lubricant-containing polymer is improved, thereby enabling long-term supply of a lubricant. However, the mechanical strength of the polymer is deteriorated.

In addition to polyolefin-based resin such as polyethylene wax, hydrocarbon based wax having a fusing point from 100 to 130° C. or more (e.g., paraffin-based synthetic wax) can be preferably used as wax. If some of the synthetic resin of comparatively low molecular weight is replaced with synthetic resin of ultrahigh molecular weight, an affinity for lubricating oil is decreased, because of a great difference (in molecular weight) between the synthetic resin of ultrahigh molecular weight and the lubricating oil. Consequently, the oil retaining characteristic of the lubricant-containing polymer and seepage of a lubricant from the lubricant-containing polymer become faster.

As a result, the time that elapses before the amount of lubricant which can be supplied from the lubricant-containing polymer to the bearing becomes shorter, thus shortening the life of a bearing. However, the mechanical strength of the polymer is increased.

In consideration of a balance between ease of moldability, mechanical strength, oil retaining characteristic, and the amount of lubricant to be supplied, the composition ratio of lubricant-containing polymer preferably comprises 0 to 5 wt. % synthetic resin to be classified into a wax; 8 to 48 wt. % synthetic resin of comparatively low molecular weight; 2 to 15 wt. % synthetic resin of ultrahigh molecular weight; and 10 to 50 total wt. % of three types of resins (i.e., a lubricant accounts for a remaining; that is, 90 to 50 wt. %).

In order to improve mechanical strength of a lubricant-containing polymer, thermoplastic resin and thermosetting resin such as those mentioned below may be added to the polyolefin-based resin.

As thermoplastic resin, there can be used polyamide, polycarbonate, polyethylene terephthalate, polyphenylene sulfide, polyether sulfone, polyether ether ketone, polyamideimide, polystyrene, and ABS resin.

As thermoplastic resin, there can be used unsaturated polyester resin, urea resin, melamine resin, phenol resin, polyimide resin, or epoxy resin.

These resins may be used solely or in combination.

In order to disperse polyolefin-based resin and other resin more uniformly, an appropriate compatibilizer may be added to the resins.

In order to improve the mechanical strength of the resin, a filler may be added to the resin. For instance, there may be added calcium carbonate, magnesium carbonate, inorganic whiskers such as potassium titanate whiskers or aluminum borate whiskers, inorganic fibers such as glass fibers or metal fibers, or a braided fabric consisting of an inorganic fiber. In the case of organic compounds, carbon black, graphite powder, carbon fiber, aramid fiber, or polyester fiber may be added.

In order to prevent deterioration of polyolefin-based resin, which would otherwise be caused by heat, there may be added antioxidant such as N,N'-diphenyl-P-phenyldiamine, 2,2'-methylenebis(4-ethyl-6-t-butylphenol). In order to prevent deterioration of the polyolefin-based resin, which would otherwise be caused by light, there may be added an ultraviolet absorbent such as 2-hydroxy-4-n-octoxybenzophenone, 2-(2'-hydroxy-3'-t-butyl-5'-methyl-phenyl)-5-chlorobenzotriazole.

The total amount of all additives (excluding polyolefin-based resin and the lubricant) is preferably 20 wt. % or less the total amount of molding feedstock, in terms of preservation of capability of supplying a lubricant.

In addition, it is an object of the second aspect of the present invention to provide a bearing for a water pump equipped with a seal device which does not become deformed even when used in a high-temperature atmosphere or upon contact with excessive cooling water.

The object of the invention is achieved by a bearing for a water pump including an outer ring fastened to a casing, a rotating shaft having at one end a driven section and at the other end an impeller, rolling elements interposed between the outer ring and the rotating shaft, and a pair of seal device fastened to respective ends of the outer ring and respectively having elastic material, thereby sealing a space between the rotating shaft and the bearing, wherein elastic material of at least the seal device disposed so as to oppose the impeller is formed from a vulcanizable fluoro rubber composition containing vinylidenefluoride-tetrafluoroethylene-polypropylene terpolymer or from a vulcanizable fluoro rubber composition containing tetrafluoroethylene-polypropylene copolymer.

Since the vinylidenefluoride-tetrafluoroethylene-polypropylene terpolymer is a ternary system and contains a relatively-low proportion of vinylidene fluoride. Further, since the vinylidenefluoride-tetrafluoroethylene-polypropylene terpolymer does not contain hexafluoropropylene, a basic compound, such as amine, is less apt to induce removal of hydrofluoric acid from vinylidene fluoride. The tetrafluoroethylene-polypropylene copolymer does not contain vinylidene fluoride as raw material. As in the case of the vinylidenefluoride-tetrafluoroethylene-polypropylene terpolymer, the tetrafluoroethylene-polypropylene copolymer does not contain hexafluoropropylene. For this reason, a basic compound, such as amine, is less apt to induce removal of hydrofluoric acid from vinylidene fluoride. Accordingly, the tetrafluoroethylene-polypropylene copolymer is suitable as elastic material of the seal device of the water pump bearing. These fluoro rubbers are much superior in chemical resistance to standard fluoro rubber (e.g., vulcanizable fluoro rubber composition containing vinylidenefluoride-hexafluoropropylen copolymer or vinylidenefluoride-hexafluoropropylene-tetrafluoroethylene terpolymer). More specifically, when vulcanizable fluoro rubber composition containing vinylidenefluoride-tetrafluoroethylene-polypropylene terpolymer or vulcanizable fluoro rubber composition containing tetrafluoroethylene-polypropylene copolymer is used as elastic material of the seal device of the water pump bearing, the seal device is not denatured and can make full use of superior sealing performance over a long period of time even when used in a high-temperature ambient or upon contact with cooling water. Hence, entry of seam into the bearing is prevented, thus avoiding a drop in the performance of the bearing.

Further, it is an object of the third aspect of the present invention to improve durability of a rubber seal device employed in a rolling bearing which is exposed to a synthetic cutting coolant of soluble type that is particularly suitable for high-speed machining or as an automobile coolant, and also to improve durability of a rubber seal device employed in a rolling bearing having urea-based grease sealed therein, as well as providing a long-life rolling bearing.

The above-mentioned object can be attained by a rolling bearing, according to the third aspect of the present invention, including at least an inner ring, an outer ring, rolling elements, a retainer, and a rubber seal device, wherein the rubber seal device is formed integrally from a fluoro rubber composition containing at least one of vinylidenefluoride-tetrafluoroethylene-polypropylene terpolymer and tetrafluoroethylene-polypropylene copolymer, and a reinforcing member.

DETAILED DESCRIPTION OF THE PREFERRED EMBODIMENTS

Figure 1:
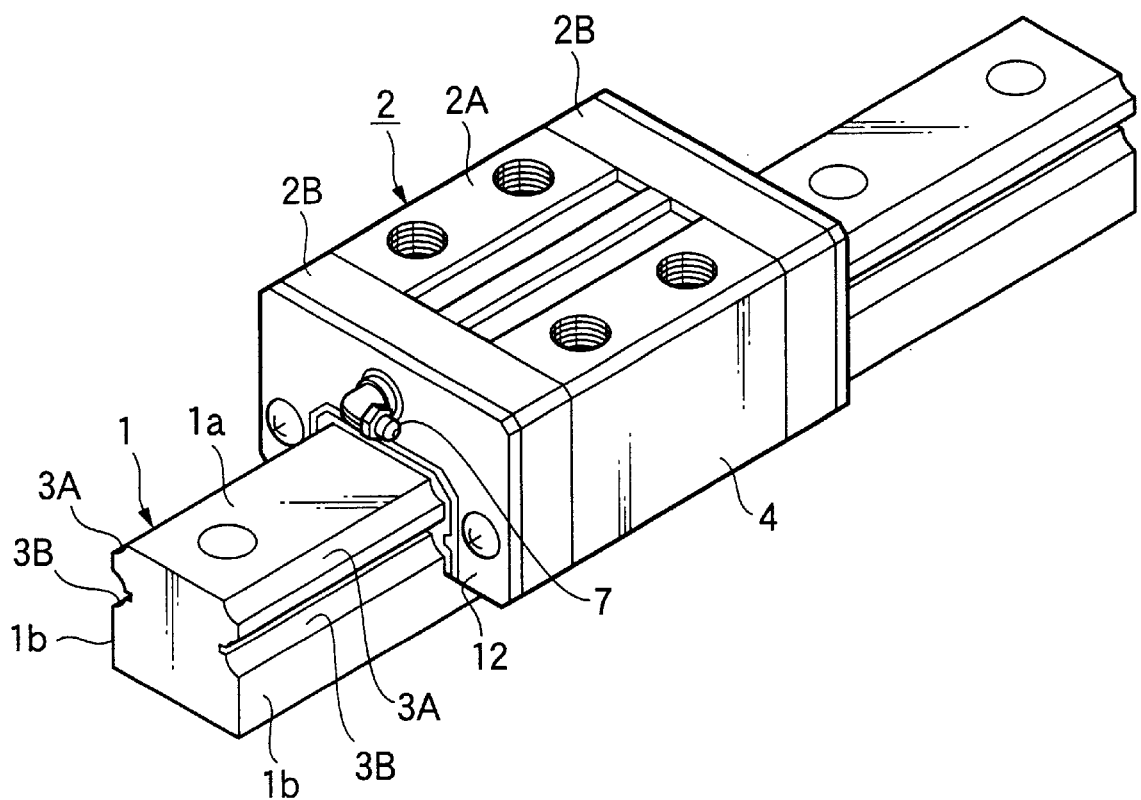
FIG. 1 is a perspective view showing a linear guide apparatus according to a first embodiment of the present invention.
Figure 2:
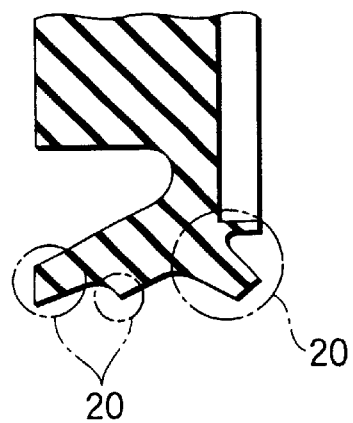
FIG. 2 is a fragmentary enlarged view showing a modification of a rubber lip section of a contact seal device.
Figure 3:
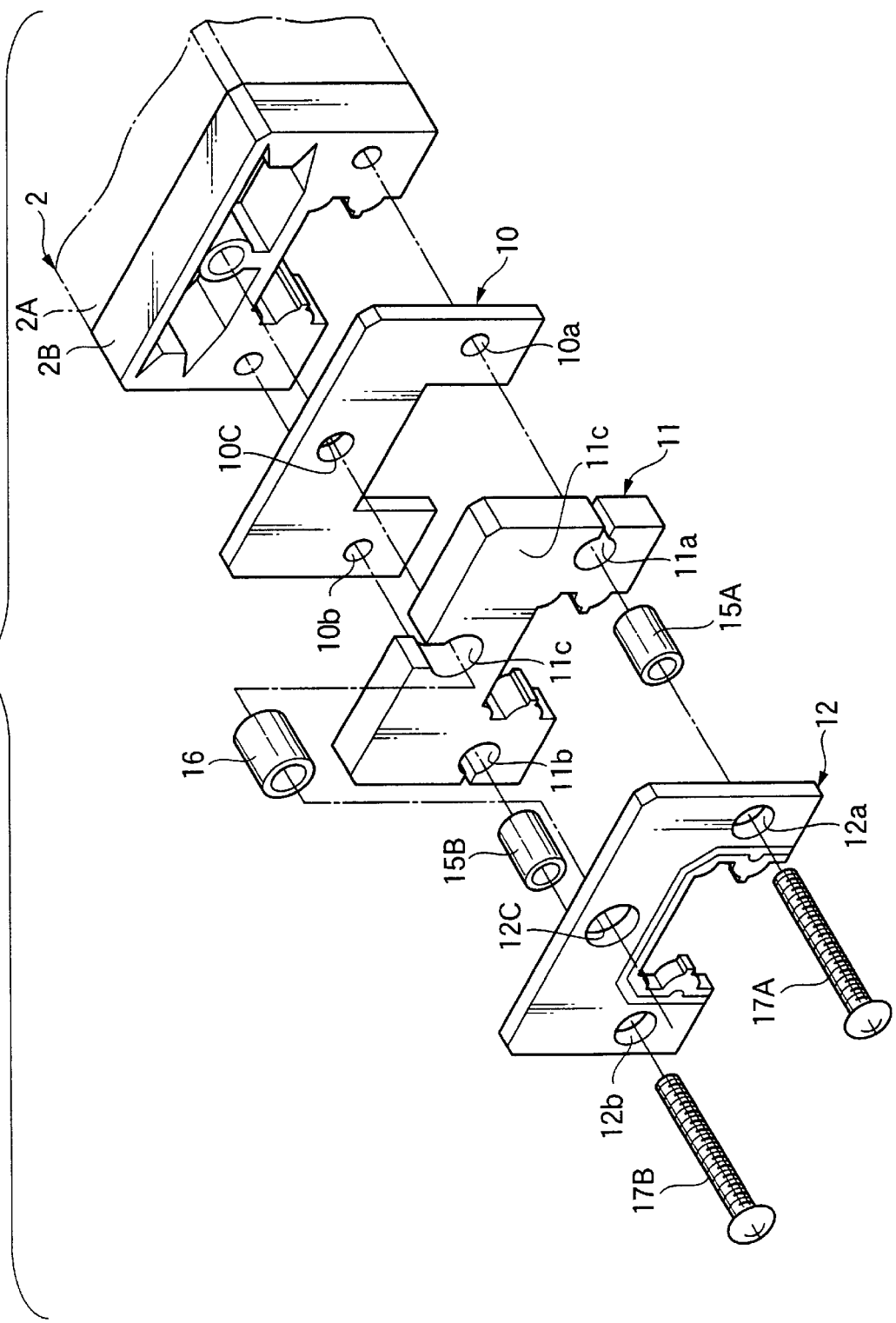
FIG. 3 is an exploded perspective view of a slider end section of a linear guide apparatus according to a second embodiment of the present invention.
Figure 4:
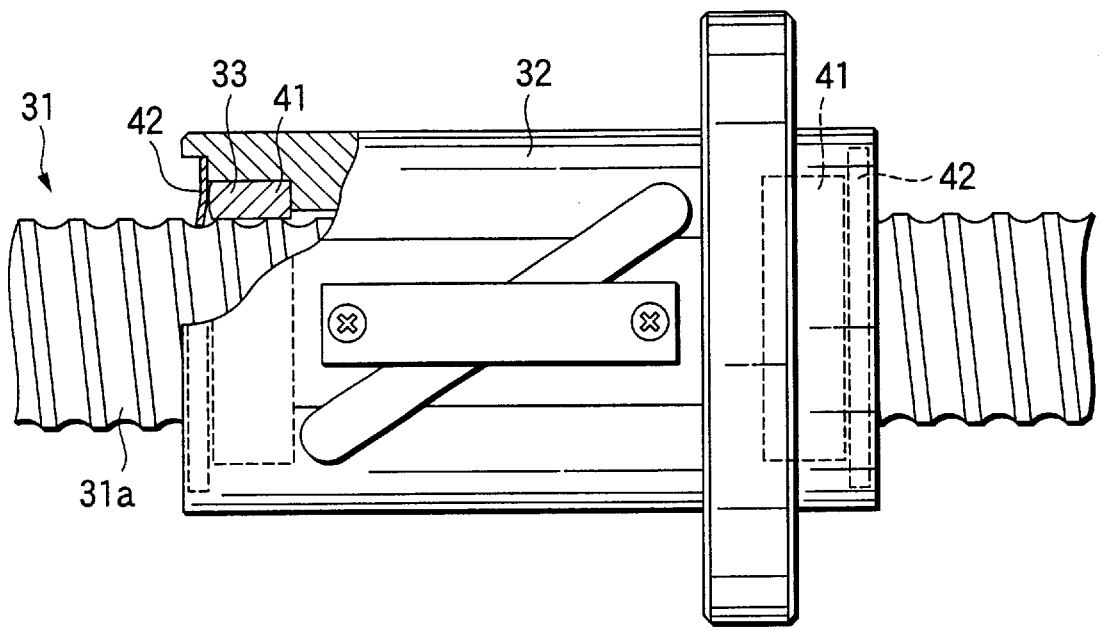
FIG. 4 is a plan view showing a ball screw apparatus according to a third embodiment of the present inventions.
Figure 5:
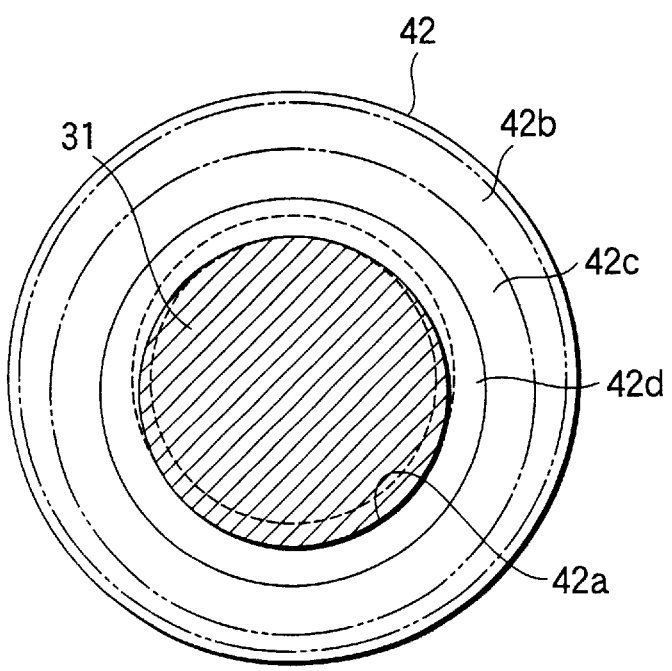
FIG. 5 is a front view of the ball screw apparatus shown in FIG. 4.
Figure 6:
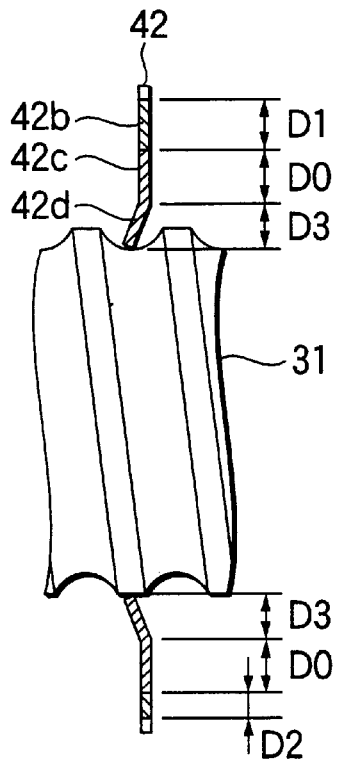
FIG. 6 shows contact between a screw groove and the contact seal device.
Figure 7:
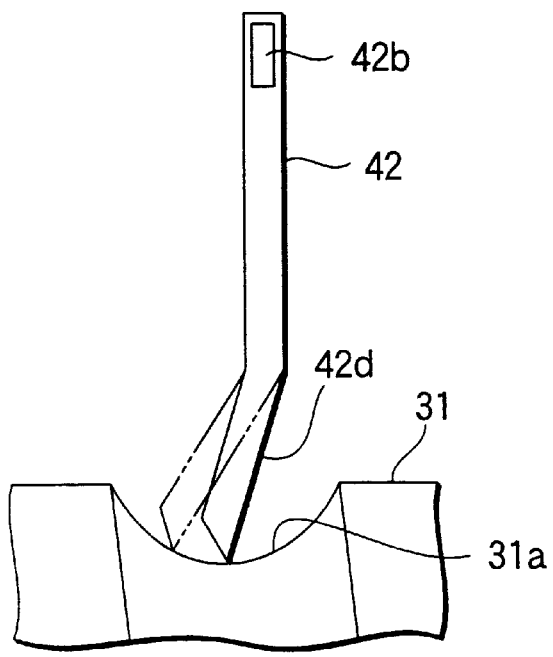
FIG. 7 is an enlarged view showing that the contact seal device remains in contact with the screw groove of the screw shaft.

Embodiments of the present invention will be described hereinbelow by reference to the accompanying drawings. FIG. 1 is a perspective view showing a linear guide apparatus according to a first embodiment of the present invention; FIG. 2 is a partially-enlarged view showing a modification of a rubber lip section of a seal member of a contact seal device; FIG. 3 is an exploded perspective view of a slider end section of a linear guide apparatus according to a second embodiment of the present invention; FIG. 4 is a plan view of a ball screw apparatus corresponding to a third embodiment of the present invention; FIG. 5 is a front view of the ball screw apparatus shown in FIG. 4; FIG. 6 is a view showing contact between a screw groove and a contact seal device; and FIG. 7 is an enlarged view showing a state in which the contact seal device is in contact with the screw groove of a screw shaft. Since the pieces of linear guide apparatus according to the first and second embodiments are essentially identical in construction with the linear guide apparatus of the related art (shown in FIGS. 8 and 9), overlapping portions are assigned the same reference numerals and explained by reference to the same.

The first embodiment will now be described by reference to FIG. 1. In the linear guide apparatus, a slider (exterior member) 2 having an essentially C-shaped cross-sectional profile straddles a guide rail (interior member) 1 extending in the axial direction thereof, so as to be relatively, axially movable with a predetermined clearance being provided there between.

A rolling-element contact groove 3A is formed in the boundary between an upper surface 1a and each of side surfaces 1b of the guide rail 1 so as to extend in the axial direction. Further, a rolling-element contact groove 3B is formed at an intermediate position on each side surface 1b of the guide rail 1 so as to extend in the axial direction.

The slider 2 comprises a slider main body 2A and end caps 2B, each end cap 2B being removably attached to the corresponding end section of the slider main body 2A. A linear rolling-element contact groove (not shown) is formed in an interior corner of each of wings 4A of the slider main body 2A, wherein the groove opposes the rolling-element contact groove 3A of the guide rail 1. Further, another linear rolling-element contact groove (not shown) is formed in the center on an interior side surface of each wing 4 and opposes the rolling-element contact groove 4B of the guide rail 1. Rolling contact passages for the rolling elements are defined between the rolling-element contact grooves 3A, 3B of the guide rail 1 and respective rolling-element contact grooves of each of the wings 4 of the slider main body 2 opposing the contact grooves 3A, 3B. A pair of rolling-element passages (not shown) are formed in a thick portion of each wing 4 of the slider main body 2 so as to extend axially-and so as to be vertically spaced away from each other.

A rolling-element circulation R section (not shown) curved into a semi-circular shape is formed in each end cap 2B for establishing communication between the rolling contact passages and the rolling-element passages. The rolling contact passages, the rolling-element passages, and the rolling-element circulation R section constitute a rolling-element endless circulation raceway. For example, a large number of rolling elements (not shown) are rotatably loaded into the rolling-element endless circulation raceway. The slider 2 smoothly travels along the guide rail 1, by means of rolling action of the rolling elements provided in the rolling contact passages of the rolling-element endless circulation raceway.

The slider 2 is equipped with a dustproof contact seal device 12 for sealing an opening of clearance between the guide rail 1 and the slider 2. The contact seal device 12 is equipped with a side seal member (a contact seal for sealing negative clearance with respect to the guide rail 1) attached to either axial end of the slider 2 (i.e., an outer surface of the end cap 2B) in the axial direction of the slider 2 for sealing an opening of clearance between the axial end section of the slider 2 and the contact seal device 12, and an underseal member to be attached to the underside of the slider 2 for sealing an opening of clearance between the underside of the slider 2 and the rail 1.

The side seal members and the underseal member are constituted of a predetermined rubber composition and are formed integrally with a core metal (reinforcing member), such as an SECC material (galvanized steel plate), by means of vulcanization bonding.

In the present embodiment, the side seal members, which are most susceptible to influence of a chemical splashed onto the linear guide apparatus of the contact seal apparatus 12, are made of a fluoro-rubber-containing rubber composition consisting of basically a copolymer. That is, at least one of vinylidenefluoride-tetrafluoroethylene-polypropylene terpolymer and tetrafluoroethylene-polypropylene copolymer.

The rubber composition of the side seal member will be described through comparison of embodiments and comparative examples.

TABLE 1

| COMPOUNDING AGENT | Example 1 | Example 2 | Example 3 | COMPARATIVE EXAMPLE 1 |
|---|---|---|---|---|
| RUBBER FEEDSTOCK: VINYLIDENEFLUORIDE-TETRAFLUOROETHYLENE-POLYPROPYLENE TERPOLYMER (WITH VULCANIZING ACCELERATOR, 2 TO 5 mol. % OF VINYLIDENE FLUORIDE) (AFLAS SP, ASAHI GLASS COMPANY) | 100 | | | |
| RUBBER FEEDSTOCK: VINYLIDENEFLUORIDE-TETRAFLUOROETHYLENE-POLYPROPYLENE TERPOLYMER (WITH VULCANIZING ACCELERATOR, 30 mol. % VINYLIDENE FLUORIDE) (AFLAS MZ201, ASAHI GLASS COMPANY) | | 100 | | |
| RUBBER FEEDSTOCK: TETRAFLUOROETHYLENE-POLYPROPYLENE COPOLYMER (AFLAS 150P, ASAHI GLASS COMPANY) | | | 100 | |
| RUBBER FEEDSTOCK: VINYLIDENEFLUORIDE-HEXAFLUOROPROPYLENE COPOLYMER (DIEL G-801, DAIKINN INDUSRIES LTD.) | | | | 100 |
| REINFORCING AGENT: MT CARBON BLACK (THERMAX N-990, R. T. VANDERBILT CO., INC.) | 30 | 30 | 30 | 20 |
| CROSSLINKING AGENT: 1,3-BIS(t-BUTYLPEROXY)-DIISOPROPYLBENZEN (PERBUTYL-P, NOF CORPORATION) | 1 | | 1 | 1.5 |

TABLE 1-continued

| COMPOUNDING AGENT | Example 1 | Example 2 | Example 3 | COMPARATIVE EXAMPLE 1 |
|---|---|---|---|---|
| VULCANIZING ACCELERATOR: MgO (KYOWAMAG 30, KYOWA CHEMICAL INDUSTRY CO., LTD. | 3 | 3 | | |
| VULCANIZING ACCELERATOR: Ca(OH)$_2$ (RHENOFIT CF, RHEIN CHEMIE) | 6 | 3 | | |
| VULCANIZING ACCELERATOR: TRIALLYISOCYANURATE (TAIC, NIPPON KASEI CHEMICAL CO., LTD) | 3 | | 5 | 4 |
| VULCANIZING ACCELERATOR: SODIUM STEARATE (SODIUM STEARATE, WAKO PURE CHEMICAL INDUSTRIES LTD.) | | | 1 | |
| UNIT (PART BY WEIGHT) | | | | |

The reinforcing agent, the crosslinking agent, and the vulcanizing accelerator were added to 100 part by weight rubber feedstock (vinylidenefluoride-tetrafluoroethylene-polypropylene terpolymer employed in Example 1), 100 part by weight rubber feedstock (vinylidenefluoride-tetrafluoroethylene-polypropylene terpolymer employed in Example 2), 100 part by weight rubber feedstock (tetrafluoroethylene-polypropylene copolymer employed in Example 3), or 100 part by weight rubber feedstock (vinylidenefluoride-hexafluoropropylene copolymer employed in Comparative Example 1), in proportions shown in Table 1. Through the following steps (1) through (3), contact seal devices were produced from the thus-formulated rubber feedstocks.

(1) Masticating Process

Materials other than the crosslinking agent and vulcanizing accelerator provided in Table 1 were charged into a Banbury mixer, and the materials were masticated at a temperature of 800° C.

(2) Kneading Process

The thus-masticated material was taken out of the Banbury mixer and charged into two rollers for rubber kneading purposes. The vulcanizing agent provided in Table 1 (or a crosslinking agent) was charged into the material while the rollers were controlled to a temperature of 50° C. After having been-cut until attaining evenness, the material was formed in the shape of a sheet.

(3) Vulcanizing Process, and Vulcanization Bonding Process

A sheet vulcanizing die assembly having a thickness of 2 mm was attached to a hot press that had been heated up to 170° C. The sheet prepared through the kneading process was placed on the die assembly and heated for 20 minutes, whereby there was produced a vulcanized rubber sheet (i.e., a side seal member) measuring 150 mm long, 150 mm wide, and 2 mm thick. In a die assembly assuming a desired geometry, the rubber sheet was bonded integrally, through vulcanization bonding, to core metal (having a substantially C-shaped cross-sectional profile and three mount screw holes formed therein) made of SECC (galvanized steel plate), thereby preparing the contact seal device 12.

The rubber described in connection with Example 1 and that described in connection with the Example 3 were subjected to secondary vulcanization at 200° C. for four hours. The rubber described in connection with the Example 2 was subjected to secondary vulcanization at 230° C. for 24 hours. The rubber described in connection with Comparative Example 1 was subjected to secondary vulcanization at 180° C. for four hours.

The side seal members described in connection with Examples 1 through 3 and that described in connection with Comparative Example 1 were subjected to tests for determining physical properties; that is, hardness, tensile breaking strength, tensile breaking elongation and volume change. Table 2 shows test results.

TABLE 2

| | Example 1 | Example 2 | Example 3 | Comparative Example 1 |
|---|---|---|---|---|
| Hardness, HD$_A$ | 76 | 74 | 74 | 69 |
| Tensile Fracture Strength, Mpa | 18.2 | 13.7 | 20.9 | 20.9 |
| Tensile Fracture Elongation, % | 220 | 210 | 260 | 460 |
| Volume Change, % | +1.2 | +3.0 | +0.3 | +5.3 |

Methods for testing physical properties are as follows:

Hardness Test

Each of the sheets produced through the vulcanizing process was punched into the shape of specimen JIS3. Three specimens thus punched were subjected to measurement of hardness in accordance with JISK6301 while being stacked.

Tensile Test

JIS3 specimens were subjected to tensile test by means of a universal testing machine, thereby measuring the tensile breaking strength and tensile breaking elongation of the specimens.

Volume Change

JIS3 specimens had been immersed in a soluble-type synthetic cutting coolant (Yushiroken Synthetic #660, Yushiro Chemical Industry Co., Ltd.) which had been diluted to a concentration to be actually employed (diluted with water up to 20-fold), at 70° C. for one week. Subsequently, the rate of volume change was measured.

As is obvious from Table 2, results of measurement of volume change show that the sheets described in connection with Examples 1 through 3 exhibit lower volume change than does the sheet described in connection with Comparative Example 1. Moreover, in relation to the sheets described in connection with Examples 1 and 2, the sheet that has been described in connection with Example 1 and has a low molar ratio of vinylidene fluoride turns out to exhibit lower volume change than that described in connection with Example 2. The sheet that has been described in connection with Example 3 and does not contain any vinylidene fluoride turns out to undergo substantially no expansion even in the soluble-type synthetic cutting coolant.

Contact seal devices 12 were subjected to running tests under the following conditions with use of a slider 2 (having an LH of 30 mm, a height of 45 mm, a width of 60 mm, a length of 85.6 mm, and a rail width of 28 mm) of the linear guide apparatus. More specifically, the side seal members described in connection with Examples 1 through 3 and that described in connection with Comparative Example 1 were formed integrally with core metal, thereby constituting the contact seal devices 12. Each of the contact seal devices 12 was attached to either end of the slider 2, and the slider 2 was subjected to a running test while the amount of grease was reduced to 10% that usually employed.

Feed speed; average speed of 32 m/min.

Stroke: 800 mm

Test temperature: 40° (in atmosphere)

Pre-load; Z1

Travel distance: 10 km

Clearance between slide section (rubber lip section) of a side seal member of the contact seal device 12 and the guide rail: negative clearance (a region that can be fastened) of 0.35 mm Test atmosphere: a 20-fold diluted soluble-type synthetic cutting coolant is splashed over the overall linear guide apparatus at a rate of only 1000 ml/min.

The following phenomenon is observed: Namely, with lapse of traveling time, abrasion of the rubber lip section proceeded for reasons of expansion of the side seal member and a drop in strength of the slide seal member under influence of the soluble-type synthetic cutting coolant. As a result, the coolant entered the inside of the linear guide apparatus, and the grease provided on a guide rail was caused to drain by the coolant. Lubrication of the linear guide apparatus was deteriorated. Provided that the time required until the end cap of the comparative example 1 failed is taken as 1, data pertaining to the time required until the end caps of Examples 1 through 3 failed are provided in Table 3.

TABLE 3

|  | Example 1 | Example 2 | Example 3 | Comparative Example 1 |
|---|---|---|---|---|
| Time until end cap failure | 2.5 | 1.8 | 3 | 1 |

As is evident from Table 3, as in the case of a volume change, the time consumed until the end caps of Examples 1 through 3 failed is longer than that consumed until the end cap of Comparative Example 1 failed. In relation to Examples 1 through 3, it is understood that the end cap that has been described in connection with Example 1 and has a low molar ratio of vinylidene fluoride involved consumption of longer time until failure than that described in connection with Example 2. It is also understood that the life of the end cap which does not contain vinylidene fluoride and has been described in connection with the third embodiment is three times as long as that described in connection with Comparative Example 1 even in the soluble-type synthetic cutting coolant.

In Example 1, one projection is formed in the area (i.e., the rubber lip section) where the side seal member of the contact seal device 12 comes into sliding contact with the guide rail 1. However, the number of projections is not limited to one. The sealing characteristic of the contact seal device 12 may be improved by means of forming two or more projections. FIG. 2 shows an example in which three projections 20 are formed in the rubber lip section of the side seal member.

By reference to FIG. 3, a linear guide apparatus according to a second embodiment of the present invention will now be described. The present embodiment is identical with the first embodiment, except that lubricant supply means consisting of a lubricant-containing polymer is provided in proximity to the contact seal device of the linear guide apparatus according to the first embodiment. Explanations will be given of only differences. Overlapping elements between the first and second embodiments are assigned the same reference numerals, and their explanations are omitted.

Provided on the outer surface of the end cap 2B fixed to either axial end of the slider main body 2A of the-slider 2 are a reinforcement plate 10, a lubricant supply member 11 consisting of lubricant-containing polymer, and the contact seal device 12, in the sequence from the end cap 2B and with superposition.

The reinforcement plate 10 is formed from a steel plate of substantially C-shaped geometry corresponding to the outer geometry of the end cap 2B and remains out of contact with the guide rail 1. The lubricant supply member 11, which is sandwiched between the contact seal device 12 and the reinforcement plate 10, assumes a substantially C-shaped geometry corresponding to the outer geometry of the end cap 2B. A C-shaped interior surface remains out of contact with the upper surface 1a and the side surfaces 1b of the guide rail 1, or at least a portion of the interior surface remains in slidable contact with the upper surface 1a and the side surfaces 1b (a clearance between the lubricant supply member 11 and the guide rail 1 is 0 to 0.2 mm).

In the present embodiment, a lubricant-containing polymer constituting the lubricant supply member 11 is constituted of 10 wt. % ultrahigh molecular weight polyethylene, 20 wt. % high-density polyethylene (of comparatively low molecular weight), and 70 wt. % paraffin-based mineral oil. The lubricant-containing polymer is prepared through injection molding.

Formed in the lubricant supply member 11 are insertion holes 11a, 11b for lockscrews 17A, 17B to be used for securing the lubricant supply member 11 to the slider main body 2A, and an insertion hole 11c for a grease nipple 7. A sleeve 15A into which the lockscrew 17A is to be inserted is fitted into the insertion hole 11a, and a sleeve 15B into which the lockscrew 17B is to be inserted is fitted into the insertion hole 11b. A sleeve 16 into which the grease nipple 7 is to be inserted is fitted into the insertion hole 11c for the grease nipple 7. The axial length of the sleeve 15A, that of the sleeve 15B, and that of the sleeve 16 are set so as to become equal to or slightly longer than the thickness of the lubricant supply member 11 (around 0.2 mm). The outer diameter of the sleeve 15A is made larger than the insertion hole 12a of the contact seal device 12 and the insertion hole 10a of the reinforcement plate 10, which are formed so as to correspond to the insertion hole 11a. The outer diameter of the sleeve 15B is made larger than the insertion hole 12b of the contact seal device 12 and the insertion hole 10b of the reinforcement plate 10, which are formed so as to correspond to the insertion hole 11b.

The lockscrew 17A is inserted into the insertion hole 12a of the contact seal device 12, the sleeve 15A of the lubricant supply member 11, and the insertion hole 10a of the reinforcement plate 10. The lockscrew 17B is inserted into the insertion hole 12b of the contact seal device 12, the sleeve 15B of the lubricant supply member 11, and the insertion hole 10b of the reinforcement plate 10. Fastening force can be prevented from acting on the lubricant supply member 11 sandwiched between the reinforcement plate 10 and the contact seal device 12, which would otherwise be caused when the contact seal device 12, the lubricant supply member 11, and the reinforcement plate 10 are secured on the end face of the slider main body 2A along with the end cap 2B by means of the lockscrews 17A and 17B. Consequently, self-contraction of the lubricant supply member 11 can be ensured. As shown in the drawing, reference numeral 12c designates an insertion hole which is formed in the contact seal device 12 and is to be used for mounting the grease nipple 7; and 10c designates an insertion hole which is formed in the reinforcement plate 10 and is to be used for mounting the grease nipple 7.

When the linear guide apparatus according to the present embodiment is actuated, the lubricant supply member 11 travels along the guide rail 1 along with the slider 2 while remaining out of or in contact with the guide rail 1. A lubricant gradually seeps through the lubricant supply member 11, and the thus-exuded lubricant is supplied to the rubber lip section of the contact seal device 12 located in close proximity to the lubricant supply member 11. Hence, stable lubrication of the rubber lip section of the contact seal device 12 can be maintained over a long period of time.

When the lubricant supply member 11 is brought into contact with the guide rail 1, a lubricant is supplied to the rubber lip section of the contact seal device 12 and rolling elements provided in the slider 2 via the surface of the guide rail 1. Hence, supply of a lubricant to the rubber lip section can be made more stable, and a self-lubricating characteristic can be imparted to the rolling elements provided in the slider 2. In other respects, the second embodiment is identical in construction-and working-effect with the first embodiment, and hence their explanations are omitted.

The linear guide apparatus having such a construction was subjected to a running test in the same manner as in the first embodiment. The rubber material composition constituting the side seal member of the contact seal device 12 was embodied in the same manner as in Examples 1 through 3 and Comparative Example 1 employed in the first embodiment. Further, the running test and criteria thereof are the same as those described in connection with the first embodiment.

Table 4 shows comparison between Examples 1 through 3 and Comparative Example 1 described in connection with the first embodiment and those described in connection with the second embodiment.

TABLE 4

| | Example 1 | Example 2 | Example 3 | Comparative Example 1 |
| --- | --- | --- | --- | --- |
| Time Elapsed Before End Cap Failure | 2.5 (First Embodiment) 2.9 (Second Embodiment) | 1.8 (First Embodiment) 2.3 (Second Embodiment) | 3 (First Embodiment) 3.6 (Second Embodiment) | 1 (First Embodiment) 1.5 (Second Embodiment) |

As is evident from Table 4, as in the case of the first embodiment, the times elapsed before failure of the end cap in Examples 1 through 3 are longer than the time required in Comparative Example 1. Further, it is understood that the time elapsed before breaking of the end cap in Example 1 involving a low molar ratio of vinylidene fluoride is longer than-that elapsed in Example 2. In connection with Example 3, which does not contain vinylidene fluoride, it is understood that the life of the end cap in a soluble-type synthetic cutting coolant is twice or more that achieved in Comparative Example 1. Effective supply of a lubricant to the rubber lip section of the lubricant supply member 11 located in close proximity to the contact seal device 12 results in a decrease in abrasion of the rubber lip section. Moreover, the lubricant is supplied also to the rolling elements provided in the slider 2, thus contributing to lubrication of the linear guide device. It is understood that the time elapsed before failure of the end cap has become longer than the times elapsed in the first embodiment.

A ball screw apparatus, which is a third embodiment of the present invention, will now be described by reference to FIGS. 4 through 7.

The ball screw apparatus comprises a screw shaft (interior member) 31 having a helical screw groove 31a formed in an outer circumferential surface thereof; a cylindrical ball screw nut (exterior member) 32; and a plurality of balls (or unillustrated rolling elements). A helical screw groove is formed in the interior surface of the ball screw nut 32 so as to oppose the screw groove 31a of the screw shaft 31 with a predetermined clearance provided between the screw shaft 31 and the ball screw nut 32. The balls are rotatably provided in a helical ball rolling space which is defined between the screw groove 31a of the screw shaft 31 and the screw groove formed in the ball screw nut 32 and has a substantially circular cross-sectional profile.

A cylindrical lubricant supply member 41 consisting of a lubricant-containing polymer is fitted into either axial end of the ball screw nut 32. An internal diameter surface of the lubricant supply member 41 remains in contact with only an outer diameter surface of the screw shaft 31. The screw thread 31a is not in contact with the inner diameter surface of the lubricant supply member 41. The lubricant supply member 41 is constituted of two semi-cylindrical members, and a narrow circumferential groove is formed in the outer peripheral surface of the lubricant supply member 41. By means of a gutter spring 33 provided in the circumferential groove, the lubricant supply member 41 is pressed radially toward the screw shaft 31 at predetermined pressure. Even if the inner circumferential surface of the lubricant supply member 41 is abraded as a result of the lubricant supply member 41 having been actuated over a long period of time, appropriate contact between the screw shaft 31 and the lubricant supply member 41 is maintained at all times. In the present embodiment, the lubricant-containing polymer constituting the lubricant supply member 41 is the same as that constituting the lubricant supply member 11 described in connection with the second embodiment.

A contact seal device 42 is provided radially outside the lubricant supply member 41 disposed at either axial end of the ball screw nut 32. The contact seal device 42 comprises a core (reinforcement member) 42b made of metal or plastic; an annular-plate-shaped seal main body 42c enclosing the core 42b therein; and a seal piece 42d extending at angle from the inner diameter section of the seal main body 42c (in the leftward direction in FIGS. 6 and 7). The seal main body 42c and the seal piece 42d constitute a seal member according to the present invention. The center of the seal piece 42d is offset with respect to the center of the seal main body 42c. An inner-diameter opening edge 42a of the seal piece 42d (rubber lip section) is made slightly smaller than the outer diameter of the screw shaft 31. As a result, the inner-diameter opening edge 42a of the seal piece 42 can come into hermetic contact with the entire circumference of the screw shaft 31.

In the present embodiment, the seal main body 42c and the seal piece 42d are formed integrally with each other from the same rubber material composition as that described in connection with the first embodiment. The seal main body 42c of the contact seal device 42 is press-fitted into a recess formed in the end face of the ball screw nut 32 and is provided in close proximity to the lubricant supply member 41.

The core 42b is formed into an annular plate, and the center of an outer diameter section of the core 42b is substantially concentric with the center of the seal main body 42c. Further, the center of an inner diameter section of the core 42b is substantially concentric with the inner-diameter opening edge 42a. The width of the core 42b changes in a circumferential direction (see D1>D2 shown in FIG. 6). Accordingly, distance DO from the inner circumferential edge of the core 42b to the inner-diameter edge of the seal main body 42c and distance D3 from the inner-diameter edge of the seal main body 42c to the inner-diameter opening edge 42a of the seal piece 42d can be made uniform over the entire circumference of the core 42b. As a result, the amount of circumferential deflection of the seal member of the contact seal device 32, which deflection arises when the contact seal device 42 comes into contact with the screw shaft 31, can be made substantially uniform.

FIG. 7 is a fragmentary enlarged view showing that the seal piece 42d of the contact seal device 42 is deformed au a result of having come into contact with the screw shaft 31. In the drawing, the seal piece 42d designated-by a solid line remains out of-contact with-the screw shaft 31, and the seal piece 42d designated by a two-dot chain line is deformed as a result of having come into contact with the screw shaft 31. Contact between the seal piece 42d and the screw shaft 31 (i.e.,.the inner-diameter opening edge 42a; a rubber lip section) always serves as a region to be used for fastening the seal piece 42d to the outer-diameter surface of the screw shaft 31 and the screw groove 31a (in reality, a clearance between the seal piece 43d and the screw shaft 31 is maintained to zero or smaller by means of deformation of the seal piece 42d).

As is seen from FIG. 7, even when the contact seal device 42 has come into contact with any point on the screw shaft 31 (the outer diameter surface of the screw shaft 31 or the screw groove 31a), the direction of deflection of the seal piece 42d can be predicted-on the basis of the geometry of the seal piece 42d. Accordingly, on the basis of a result of prediction, the geometry of the seal piece 42d can be designed such that the highest sealing characteristic is achieved.

The seal piece 42d of the contact seal device 42 comes into slidable contact with the screw shaft 31 at the time of movement of the ball screw nut 32, thereby preventing entry of foreign matter, such as dust into the ball screw nut 32 from an end opening of a clearance existing between the screw shaft 31 and the ball screw nut 32 and leakage of a-lubricant to the outside from the ball screw nut 32.

The contact seal device 42 and the lubricant supply member 41 yield substantially the same working-effects as those yielded in the first and second embodiments, and hence repeated explanation is omitted.

Embodiments according to the second aspect of the present invention will be described in detail hereinbelow.

Figure 13:
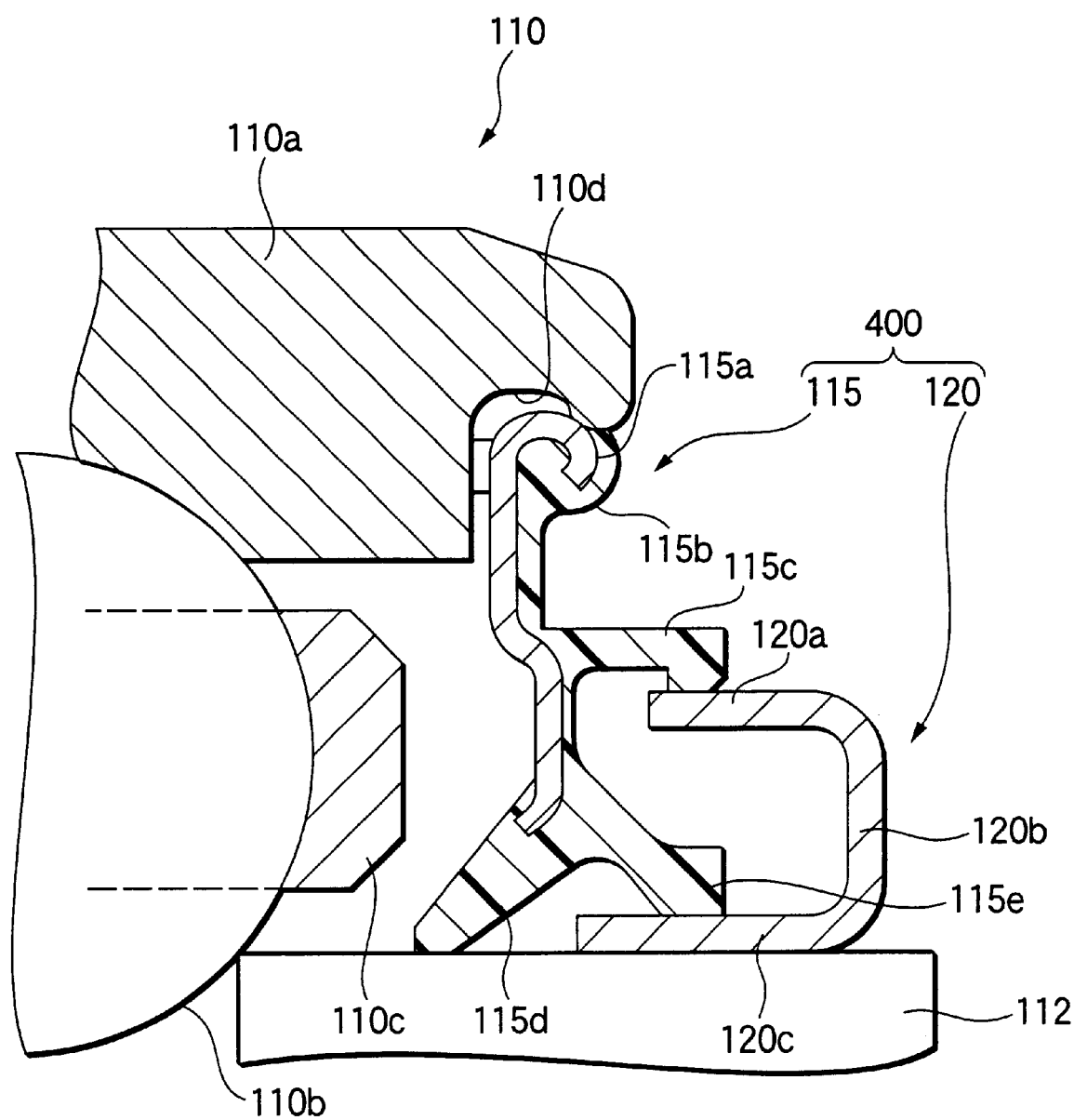
FIG. 13 is an axial cross-sectional view showing an example of a seal device.

A bearing for a water pump according to one embodiment of the present invention comprises a seal device shown in FIG. 13. More specifically, a bearing 110 comprises an outer ring 110a; a rotating shaft 112 constituting an inner ring; balls 110b sandwiched between the outer ring 110a and the rotating shaft 112; and a retainer 110c for retaining the balls 110b. A seal device 400 constituted of a sealing plate 115 and a thrower 120 is built in the bearing. The sealing plate 115 is provided in a seal groove 110d formed in the axial end portion of the outer ring 110a. The sealing plate 115 comprises a core 115a and elastic material 115b, and the resilient member 115b comprises three lip sections 115c, 115d, and 115e. The core 115a has a reversed L-shape cross-sectional profile and is squeezed into the seal groove 110d of the outer ring 110a. The elastic material 115b is provided in intimate contact with the outer surface of the core 115a.

The elastic material 115b is made of fluoro rubber to be described later. The elastic material 115b has a bifurcated cross-sectional profile. A main lip section 115e constituting one of the bifurcated portion obliquely extends in the lower right direction, and a sub-lip section 115d constituting the other of the bifurcated portion obliquely extends in a lower left direction. A cylindrical third lip section 115c is formed in the middle of the core 115a so as to extend from the elastic material 115b in the right direction in the drawing.

The stainless thrower 120 is provided on the rotating shaft 112. The thrower 120 comprises a small cylinder 120c to be closely fitted to the rotating shaft 112; a large cylinder 120a concentrically enclosing the small cylinder 120c, and a flange 120b interconnecting the small cylinder 120c and the large cylinder 120a with in the radial direction. The third lip section 15c of the elastic material 115b is in contact with the outer periphery of the large cylinder 120a of the thrower 120, thereby constituting a hermetic seal. The main lip section 115e is in contact with the outer periphery of the small cylinder 120c, thereby constituting a hermetic seal. The sub-lip section 115d is in contact with the outer circumferential surface of the rotating shaft 112, thus constituting a-hermetic seal.

The elastic material 115b is formed from a vulcanizable fluoro rubber composition containing vinylidenefluoride-tetrafluoroethylene-polypropylene terpolymer or from a vulcanizable fluoro rubber composition containing tetrafluoroethylene-polypropylene copolymer. No particular limitations are imposed on the proportions of polymers in each of these copolymers. The proportion of vinylidenefluoride-tetrafluoroethylene-polypropylene terpolymer comprises 1 to 70 mol. % vinylidene fluoride, 10 to 70 mol. % tetrafluoroethylene, and 1 to 70 mol. % polypropylene. More preferably the proportion of vinylidenefluoride-tetrafluoroethylene-polypropylene terpolymer comprises 1 to 30 mol. % vinylidene fluoride, 10 to 60 mol. % tetrafluoroethylene, and 10 to 60 mol. % polypropylene. The proportion of tetrafluoroethylene-polypropylene copolymer comprises 20 to 80 mol. % tetrafluoroethylene, and 20 to 80 mol. % polypropylene. More preferably, the proportion of tetrafluoroethylene-polypropylene copolymer comprises 30 to 60 mol. % tetrafluoroethylene, and 30 to 60 mol. % polypropylene. The copolymer may be copolymerized with a few mol percentages so-called cure site monomer (e.g., an iodine compound or a bromine compound). Alternatively, after polymerization, an unsaturated bond may be introduced into the copolymer through postprocessing. As such vinylidenefluoride-tetrafluoroethylene-polypropylene terpolymer, there are available "BRE LJ-298005" (Tradename; DINEON Co., Ltd.) and "AFLAS SP" (Tradename; Asahi Glass Company) and "AFLAS SZ" (Tradename; Asahi Glass Company). As tetrafluoroethylene-polypropylene copolymer there is available "AFLAS 150) (Tradename; Asahi Glass Company).

No particular limitations are imposed on the method of vulcanizing the copolymer. A common method of vulcanizing fluoro rubber; e.g., a polyol vulcanization method or a peroxide vulcanization method, can be employed. For example, known polyhydroxy aromatic-series compounds or fluorine hydroxy fatty-series compounds can be employed as a polyhydroxy compound which acts as a vulcanizing agent under a polyol vulcanization method. Of those compounds, hydroquinone, 2,2-bis(4-hydroxyphenyl) propane[bisphenol A] and 2,2-bis(4-hydroxyphenyl) perfluoropropane[bisphenol AF] are used preferably. The compounds may be alkali metal salt, alkaline earth metal salt, or organic onium compounds. The polyol vulcanizing agent is preferably added in an amount of 0.5 to 10 parts by weight to 100 parts by weight of copolymer. In this range, there is no chance of occurrence of under or over vulcanization.

An organic peroxide serving as a vulcanizing agent under the peroxide vulcanization method is an organic compound whose molecules have —o—o bonds. More specifically, peroxyketal, dialkylperoxide, peroxyester, and hydroperoxide are mentioned as organic peroxides. More specifically, there can mentioned benzoyl peroxide, dicumyl peroxide, 2,5-dimethyl-2,5-di-(t-butylperoxy) hexane, 2,5-dimethyl-2, 5-di-(t-butylperoxy) hexane-3, α,α'-bis(t-butylperoxy)-p-diisopropylbenzene, and 1,1-bis(t-butylperoxy)-3,3,5-trimethylcyclohexane. The organic peroxide is added in an amount of 0.5 to 10 parts by weight to 100 parts by weight of the copolymer. In this range, there is no chance of occurrence of under or over vulcanization.

At the time of vulcanization of polyol, a metal oxide and a metal hydroxide are added as a vulcanization assistant are mixed as essential components. More specifically, there can be exemplified calcium hydroxide, magnesium hydroxide, calcium oxide, zinc oxide, lead oxide, and magnesium oxide. Of those components, combined use of calcium hydroxide and magnesium oxide is preferable. The metal oxide and a metal hydroxide are preferably added in an amount of 0.5 to 50 parts by weight, more preferably, 1 to 30 parts by weight, to 100 parts by weight of the copolymer. Further, onium salt (quaternary ammonium salt or quaternary phosphonium salt) may be mixed into the copolymer. More specifically, as quaternary ammonium salt there are exemplified tetrabutylammonium hydrogensulfate, tetramethylammonium hydrogensulfate, tetraethylammonium hydrogensulfate, trioctylmethylammonium hydrogensulfate, tridecylmethylammonium hydrogensulfate, or trimethylbenzylammonium hydrogensulfate. As quaternary phosphonium salt, there are exemplified tetrabutylphosphoniumchloride, tetrabutylphosphoniumbromide, tributyl(metoxypropyl) phosphoniumchloride, trioctylmethylphosphoniumchloride, and tridecylmethylphosphoniumchloride. Two or more of those components may be used in combination. The onium salt is added in an amount of 0.3 to 5 parts by weight to 100 parts by weight of the copolymer. In this range, there is no chance of occurrence of under or over vulcanization.

At the time of vulcanization of peroxide, unsaturated multifunctional compounds are used as a vulcanizing agent. For example, polyallyl compounds, methacrylate compounds, divinyl compounds, or polybutadiene arc mentioned. Of those compounds, triallyl isocyanurate and triallyl cyanurate are-preferable. The unsaturated multifunctional compounds are preferably added in an amount of 0.5 to 20 parts by weight, preferably, 1 to 10 parts by weight, to 100 parts by weight of the copolymer.

The copolymer may be further mixed with a filler which has hitherto been used as a reinforcement filler, such as a carbon black, silica, clay, talc or calcium carbonate; pigment; dye; an age inhibitor; an oxidation inhibitor; a fixing agent; a processing agent; a plasticizer; and a mold releasing agent.

The method of producing elastic feedstock for the seal device 400 through use of the components is not limited to any particular method. Vinylidenefluoride-tetrafluoroethylene-polypropylene terpolymer or tetrafluoroethylene-polypropylene copolymer, which is a rubber feedstock, can be uniformly mixed with a filler and other additives through use of a known rubber kneading apparatus, such as a rubber mixing mill, a pressure kneader, or a Banbury mixer. No particular limitations are not imposed on requirements for kneading. The rubber feedstock is usually kneaded at a temperature of 30 to 80° C. for 5 to 60 minutes, thereby sufficiently dispersing the additives.

No particular limitations are imposed on the method of manufacturing the elastic material 15b of the seal device 400. The only requirement is to heat the fluoro rubber composition in a die assembly. Elastic material can be made by means of a known rubber forming method such as compression molding, transfer molding, and injection molding. For example, in the case of compression molding, a core (a core of the seal device has been formed) previously coated with an adhesive is inserted into a die assembly. A sheet of an unvulcanized rubber composition that has been manufactured according to the previously-described method is placed on the core. The die assembly is usually pressurized and vulcanized at a temperature of 120 to 250° C. for about 3 minutes to 2 hours. The thus-manufactured elastic material 15b is subjected to postvulcanization, whereby the material is completely vulcanized. Concurrently, it has been admitted that volatilization of an excessive volatile component yields an effect of improving the physical properties of the elastic material 15b. Hence, volatilization of a volatile component is desirable. No particular limitations are imposed on postvulcanization. However, the elastic material can be heated at a temperature of; e.g., 150 to 250° C. for 1 to 50 hours.

EXAMPLES

The present invention will be described in more detail by reference to examples. However, the examples are intended to pose no limitation on the invention.

First Test

In order to ascertain cooling-water-resistance of the elastic material of the seal device of the water pump bearing according to the present invention, JIS dumbbell test pieces 3 (each having a thickness of 2 mm) having compositions provided in Table 5 were immersed for 500 hours in an LLC (diluted with water up to 50%) by CCI Co., Ltd. at 140° C., and changes in physical properties of the specimens were measured. Reference symbol *1 provided in the left column of Table 5 designates the trade name of vinylidenefluoride-tetrafluoroethylene-polypropylene terpolymer manufactured by Asahi Glass Corporation; *2 designates the tradename of tetrafluoroethylene-polypropylene copolymer manufactured by Asahi Glass Corporation; *3 designates the tradename of intermediate and high nitril rubber; *4 designates the trade name of hydrogenated nitril rubber manufactured by Zeon Japan Corporation; *5 designates the trade name of vinylidenefluoride-hexafluoropropylene tetrafluoroethylene-polypropylene copolymer manufactured by Daikin Corporation; *6 designates the tradename of SRF-class carbon black manufactured by Asahi Carbon Corporation; *7 designates tho tradename of diatomaceous earth by Manvil Corporation; *8 designates the trade name of magnesium oxide manufactured by Kyowa Chemical Industry Co., Ltd.; *9 designates the tradename of calcium hydroxide manufactured by Ohmi Chemical Industry Co., Ltd.; *10 designates the trade name of an age inhibitor manufactured by Ouchishinko Chemical Industrial Co., Ltd.; *11 designates the tradename of another age inhibitor manufactured by Ouchishinko Chemical Industrial Co., Ltd.; *12 designates the tradename of an organic peroxide manufactured by NOF Corporation; *13 designates the tradename of triallyl isocyanurate manufactured by Nippon Kasei Chemical Co., Ltd; *14 designates the tradename of stearic acid manufactured by Kao Corporation; *15 designates the tradename of a vulcanizing accelerator manufactured by Ouchishinko Chemical Industrial Co., Ltd.; and *16 designates the tradename of another vulcanizing accelerator manufactured by Ouchishinko Chemical Industrial Co., Ltd.

In relation to preparation of samples, samples were first kneaded in the proportions described in Table 5 through use of a mixing mill, whereby unvulcanized rubber sheets of about 2.2 mm thick were prepared. The unvulcanized rubber sheets were inserted into a die assembly measuring 150 mm long, 150 mm wide, and 2 mm thick. The sheets were than vulcanized and molded at a load of 4.9 MPa (50 kgf/cm$^2$) under the primary vulcanization conditions provided in Table 5. Further, in relation to Examples 1 through 3 and Comparative Examples 2 and 3, the sheets were subjected to postvulcanization described in Table 5 in an oven while taken out from the die assembly. The thus-produced vulcanized rubber sheets were punched into the shape of JIS dumbbell specimen 3, and physical properties of the sheets in an-ordinary state were measured. Three dumbbell specimens stacked into a single piece were subjected to measurement of hardness through use of duro-meter A hardness tester in accordance with JIS K 6253. The tensile characteristics of the rubber sheets were measured in accordance with JIS K 6251. LLC resistance of each of the rubber sheets was measured in accordance with JIS K 6258 through use of an autoclave. All measurement results are provided in Table 5.

TABLE 5

|  | Example 1 | Example 2 | Example 3 | Comparative Example 1 | Comparative Example 2 | Comparative Example 3 |
|---|---|---|---|---|---|---|
| FEED STOCK |  |  |  |  |  |  |
| AFLAS SP *1 | 100 | 100 |  |  |  |  |
| AFLAS 150P *2 |  |  | 100 |  |  |  |
| N23OX *3 |  |  |  | 100 |  |  |
| Zetpol 2010 *4 |  |  |  |  | 100 |  |
| Diel G-801 *5 |  |  |  |  |  | 100 |
| MT carbon | 30 |  | 30 |  |  | 30 |
| Asahi #50 *6 |  |  |  | 60 | 60 |  |
| Celite #219 *7 |  | 30 |  |  |  |  |
| Kyowa Mag 150 *8 | 3 | 3 | 3 |  |  |  |
| Culpit *9 | 6 | 6 | 6 |  |  |  |
| Nolack CD*10 |  |  |  | 1 | 1 |  |
| Nolack MBZ *11 |  |  |  | 1 | 1 |  |
| Peroxymon F-40 *12 | 3 | 3 | 3 |  | 10 | 3 |
| TAIC *13 | 3 | 3 | 5 |  |  | 4 |
| Runac S-35 *14 |  |  |  | 1 |  |  |
| ZnO #1 |  |  |  | 5 |  |  |
| Sulfur |  |  |  | 0.5 |  |  |
| Nokseler TT *15 |  |  |  | 1.5 |  |  |
| Nokseler CZ *16 |  |  |  | 2 |  |  |
| VULCANIZING CONDITION |  |  |  |  |  |  |

TABLE 5-continued

|  | Example 1 | Example 2 | Example 3 | Comparative Example 1 | Comparative Example 2 | Comparative Example 3 |
|---|---|---|---|---|---|---|
| PRIMARY VULCANIZATION (° C. × min.) | 170 × 20 | 170 × 20 | 170 × 20 | 170 × 20 | 170 × 10 | 170 × 20 |
| SECONDARY VULCANIZATION (° C. × min.) | 200 × 4 | 200 × 4 | 200 × 4 | none | 130 × 2 | 200 × 4 |
| PHYSICAL PROPERTIES IN NORMAL STATE | | | | | | |
| HARDNESS (HAD) | 76 | 80 | 71 | 70 | 74 | 80 |
| TENSILE STRENGTH (MPa) | 18.5 | 10.2 | 22.0 | 21.0 | 29.5 | 12.2 |
| ELONGATION (%) | 230 | 220 | 250 | 420 | 280 | 135 |
| LLC RESISTANCE | | | | | | |
| CHANGE IN HARDNESS (pts) | −5 | −7 | −3 | +27 | −10 | −23 |
| RATE OF CHANGE IN TENSILE STRENGTH (%) | −10 | −15 | 0 | −70 | −40 | −65 |
| RATE OF CHANGE IN ELONGATION (%) | −5 | −8 | −5 | −93 | −45 | −80 |
| RATE OF VOLUME CHANGE (%) | +7 | +6 | +5 | +10 | +15 | +21 |

As is evident from the measurement results provided in Table 5, the rubber composition using vinylidenefluoride-tetrafluoroethylene-polypropylene terpolymer or tetrafluoroethylene-polypropylene copolymer as a rubber feedstock, which falls within the scope of the invention, shows superior LLC resistance. The rubber composition according to Comparative Example 1 using nitril rubber as rubber feedstock shows hardening deterioration. The rubber composition according to Comparative Example 2 using hydrogenated nitril rubber as rubber feedstock is superior to the rubber composition according to Comparative Example 3 using tetrafluoroethylene-polypropylene copolymer, which is standard fluoro rubber, as a rubber feedstock. However, the rubber composition according to Comparative Example 2 shows swelling and a drop in tensile characteristic.

Second Test

Figure 8:
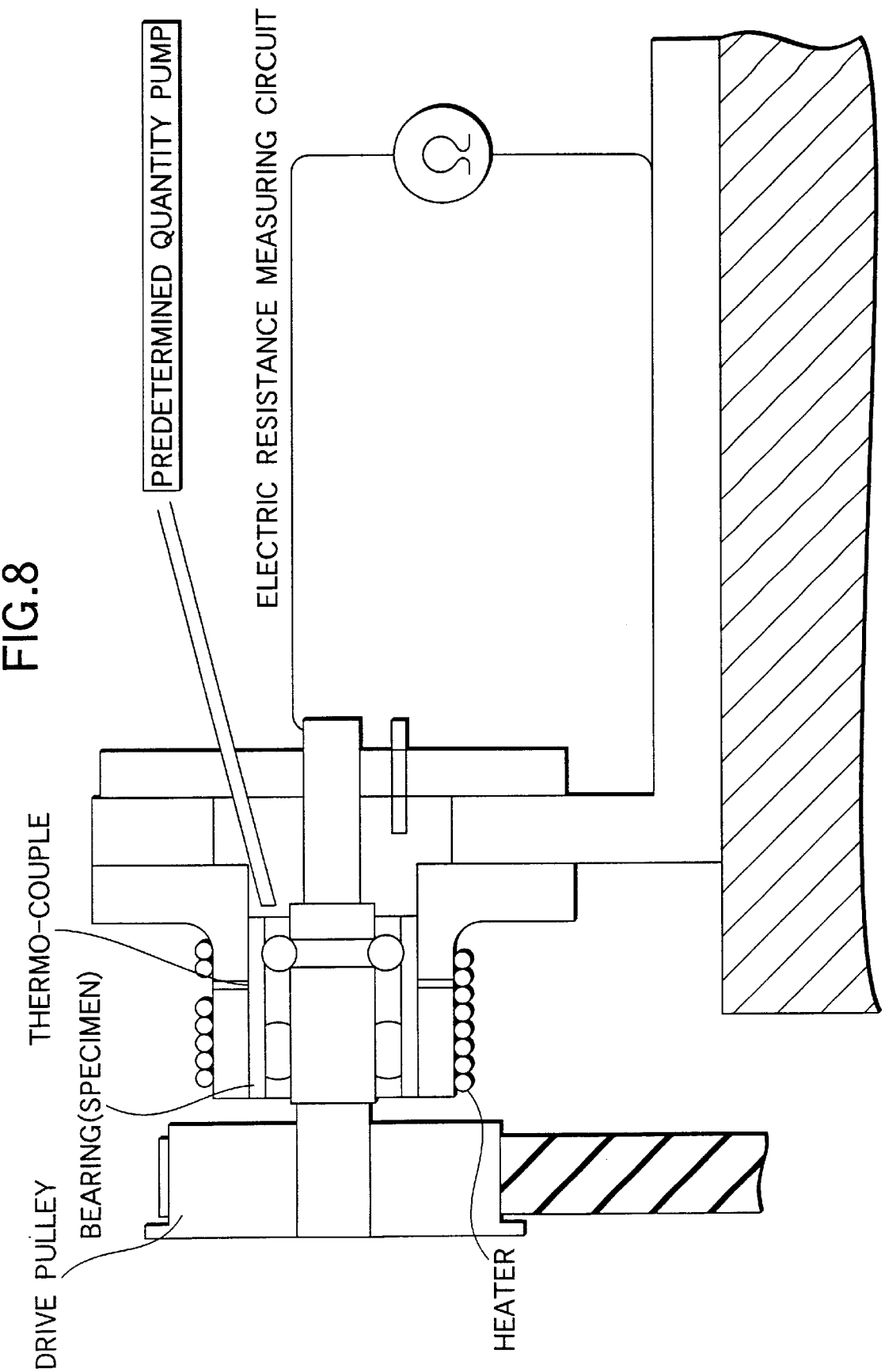
FIG. 8 is a cross-sectional view showing a tester.
Figure 9:
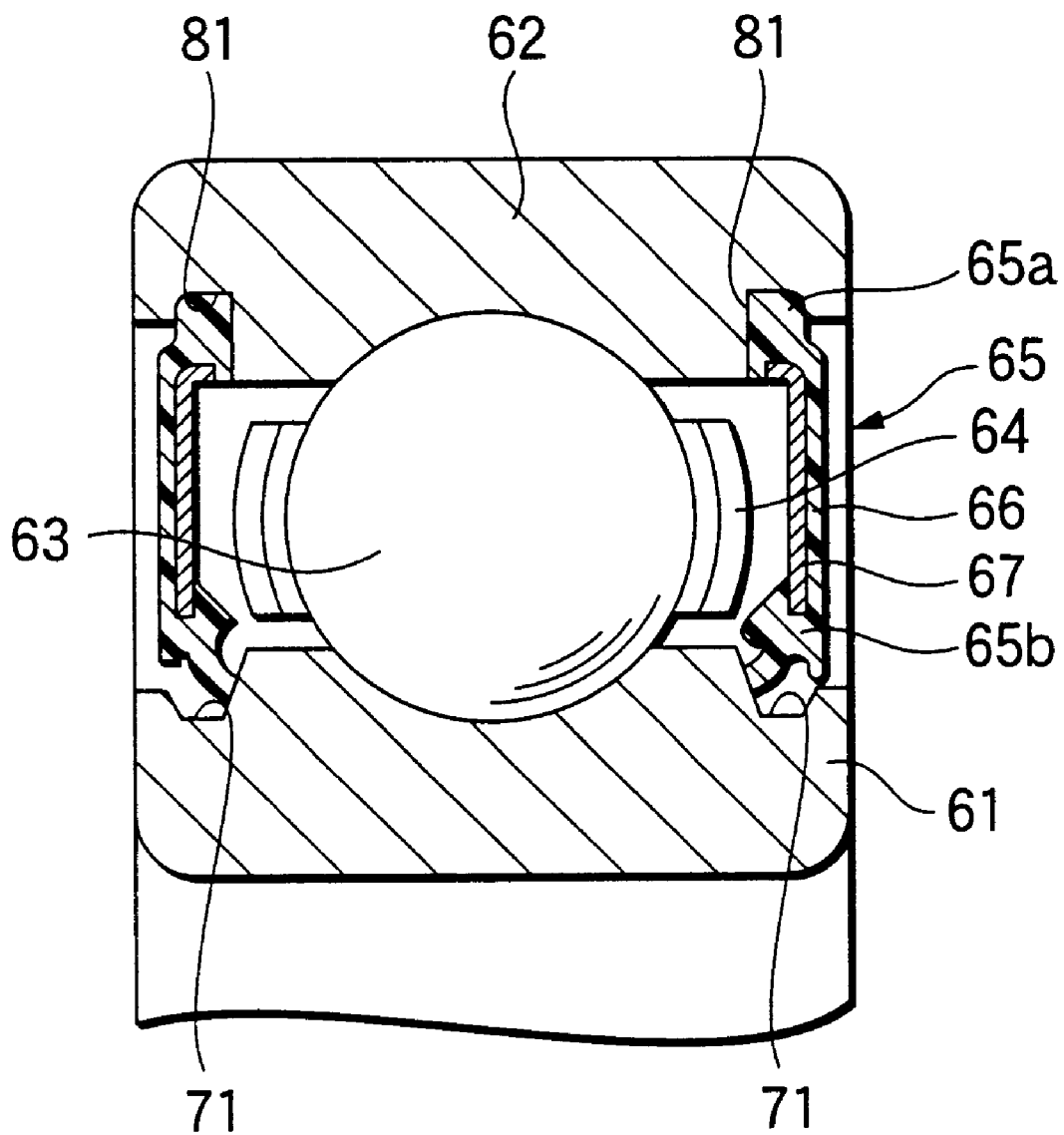
FIG. 9 is a cross-sectional view showing an embodiment of a rolling bearing according to the third aspect of the present invention.
Figure 10:
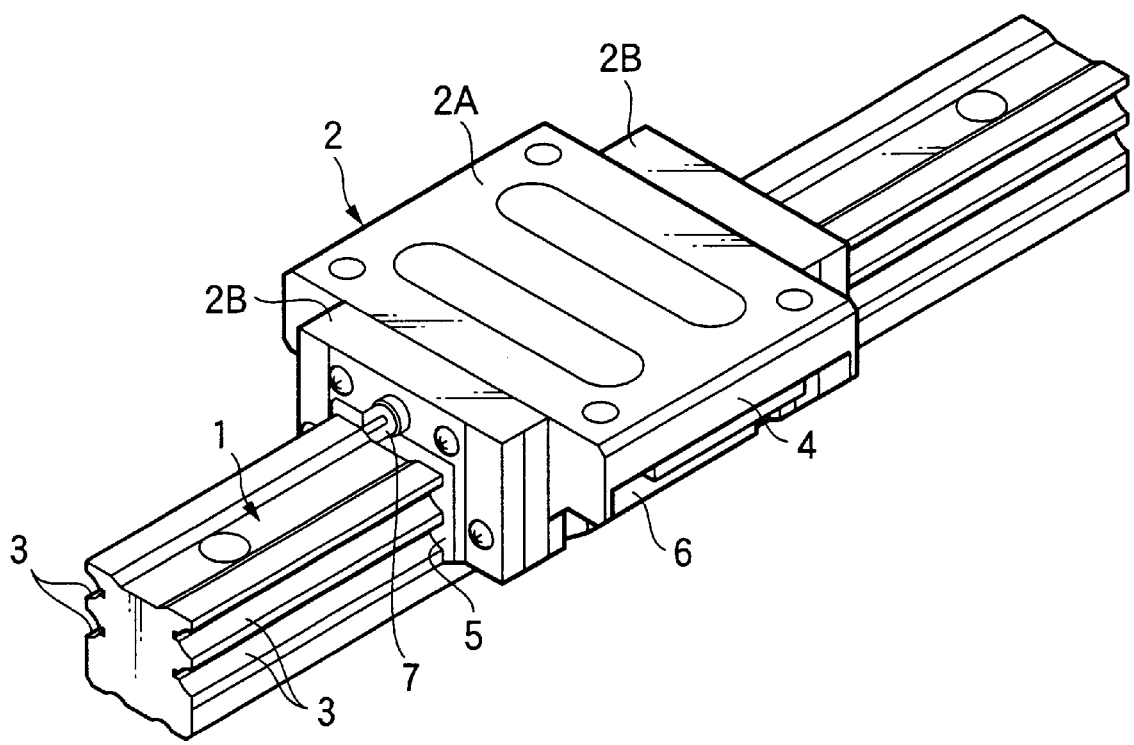
FIG. 10 is a perspective view showing a related-art linear guide apparatus.
Figure 11:
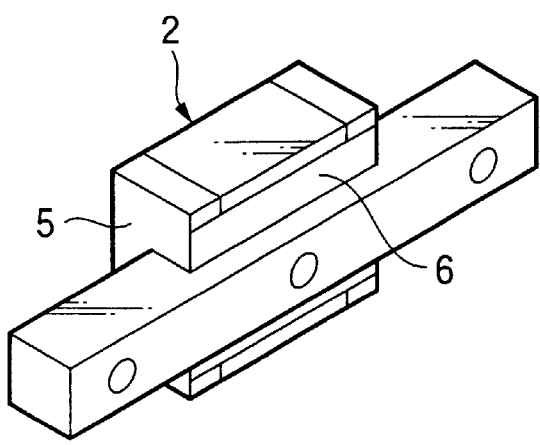
FIG. 11 is a perspective view showing the underside of the linear guide apparatus shown in FIG. 10.
Figure 12:
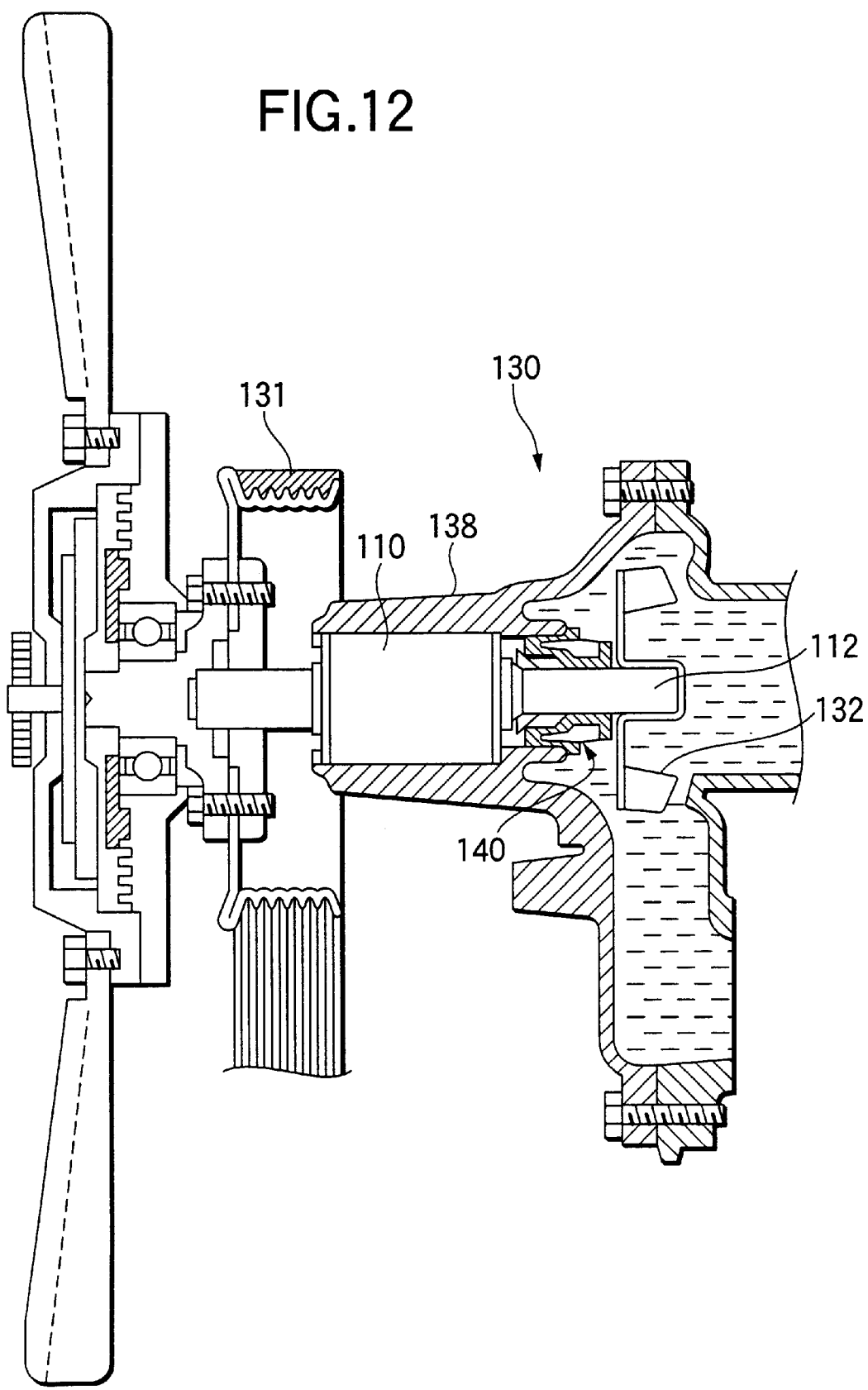
FIG. 12 is an axial cross-sectional view showing an example of water pump to which the present invention is applied.

The heat resistance and waterproof of the bearing having the seal device shown in FIG. 13 were tested through use of a tester shown in FIG. 8. The tester shown in FIG. 8 is constructed so as to supply a given quantity of cooling water to the end of the bearing from a metering pump. Chronological changes in performance of the elastic material of the seal device provided at the end of the bearing were measured by use of the tester. The elastic material of the seal device employed in the test was formed from the same composition as that used in Examples 1 and 3 and those used in Comparative Examples 2 and 3 described in connection with the first test.

In relation to manufacture of the test bearing, an unvulcanized rubber composition was prepared in the same manner as in the first test. The thus-produced unvulcanized rubber sheet was inserted into a core 15a previously coated with an adhesive. The rubber sheet was vulcanized and molded at the primary vulcanization conditions provided in Table 5 under a load of 2.9 MPa (30 kgf/cm$^2$). The rubber sheet was subjected to postvulcanization under the secondary vulcanization conditions provided in Table 5 in an oven while taken out from the die assembly. The thrower 120 was attached to the thus-produced sealing plate 115, and the rubber sheet was built into the bearing 110, thus producing a test bearing.

Test conditions are as follows:

Bearing temperature: 150° C.

LLC: LLC manufactured by CCI Corporation

Quantity of water charged into LLC; 50 ml/min.

Rotating speed: 8000 rpm

Test Time: 1000 hours

As items for evaluation, changes in the hardness of the main lip 15e and deformation of the third lip (corrugation). Hardness of the test bearing was measured through use of an IRHD (International Rubbe Harness Degree) micro hardness tester in accordance with JIS K 6253. Test results are provided in Table 6.

TABLE 6

|  | Example 1 | Example 3 | Comparative Example 2 | Comparative Example 3 |
|---|---|---|---|---|
| Hardness Change (pts) | −3 | −2 | −8 | −15 |
| Deformation of third lip | none | none | corrugated | greatly corrugated |

As is evident from the results provided in Table 6, the rubber composition using vinylidenefluoride-tetrafluoroethylene-polypropylene terpolymer or tetrafluoroethylene-polypropylene copolymer as a rubber feedstock, which falls within the scope of the invention, shows small changes in hardness of the main lip. Further, deformation of the third lip of the rubber composition is not observed. The rubber composition is considered to have superior LLC resistance and sealing performance. The rubber composition according to Comparative Example 2 using hydrogenated nitril rubber as rubber feedstock is superior to the rubber composition according to Comparative Example 3 using vinylidenefluoride-hexafluoropropylen copolymer, which is standard fluoro rubber, as a rubber feedstock. However, the rubber composition according to Comparative Example 2 yielded great changes in hardness of the main lip and deformation of the third lip. Hence, the bearing using the rubber composition according to Comparative Example 2 is considered to be inferior to the bearings according to Examples in terms of sealing performance and to have shorter life.

A rolling bearing according to the present invention will be described in detail hereinbelow.

In the present invention, no particular limitations are imposed on the construction of a rolling bearing. For example, a ball bearing illustrated in FIG. 9 can be exemplified. In the illustrated ball bearing, a plurality of balls 63; namely, rolling elements, are rotatably retained at substantially uniform intervals between an inner ring 61 and an outer ring 62 by means of a retainer 64, and those are sealed by a rubber seal device 65.

The rubber seal device 65 is formed integrally from a seal main body 66 consisting of a rubber composition to be described later, and a reinforcing member 67. One end section 65a of the rubber seal device 65 is fastened to an attachment groove 81 formed in an inner peripheral edge of the outer ring 82. The other end section of the rubber seal device 85 acts as a lip section 65b and is formed so as to come into contact with a seal groove 71 formed in an outer periphery of the inner ring 61. No particular limitations are imposed on the reinforcing member 67, and the reinforcing member 67 is usually formed by means of forming galvanized sheet iron (e.g., SECC) into an annular shape.

A rubber composition according to the present invention is formed from fluoro rubber selected from vinylidenefluoride-tetrafluoroethylene-polypropylene terpolymer and tetrafluoroethylene-polypropylene copolymer, by means of adding to the rubber various additives, such as various types of fillers, a vulcanized additive, an age inhibitor, and processing aids. At the time of manufacture of vinylidenefluoride-tetrafluoroethylene-polypropylene terpolymer or tetrafluoroethylene-polypropylene copolymer, there may be adopted any one of various polymerization methods, such as a bulk polymerization method, a suspension polymerization method, an emulsion polymerization method, and a solution polymerization method, as required. Any one of a catalytic polymerization method using a free radical initiator, an ionizing radiation polymerization method, and a redox-based polymerization method can be adopted, as required.

In order to facilitate vulcanization of vinylidenefluoride-tetrafluoroethylene-polypropylene terpolymer by an organic peroxide, a carbon-carbon double bond may be introduced to the principal chain of a polymer, acting as a polymerization site, through removal of hydrogen fluoride; or iodine-containing or bromine-containing monomer may be copolymerized with the principal chain of the polymer. Since the rubber feedstock contains a vinylidene fluoride site, the rubber feedstock acquires a good vulcanization characteristic without introduction of the vulcanization site, which would usually be effected for vulcanizing an organic peroxide, so long as at least either a di-metal-hydroxide or a di-metal-oxide, and an organic onium compound are mixed with the rubber feedstock. Thus, a vulcanized material having superior physical properties can be produced.

Desirable proportions in which three monomers are to be polymerized comprise 1 to 30 mol. % vinylidene fluoride (more preferably, 2 to 5 mol. % vinylidene fluoride), 40 to 70 mol. % tetrafluoroethylene, and 30 to 60 mol. % polypropylene. Resistance to a chemical, such as amine, and a vulcanization characteristic are greatly dependent on a proportion of polymerization of vinylidene fluoride. In view of a vulcanization characteristic, a larger proportion of vinylidene fluoride is preferable. However, an excessive proportion of vinylidene fluoride results in corresponding deterioration of chemical resistance. If chemical resistance is pursued at the expense of the vulcanization characteristic, a desirable proportion of vinylidene fluoride is 2 to 5 mol. %.

Vinylidene fluoride does not exist in the structure of tetrafluoroethylene-polypropylene copolymer. Hence, tetrafluoroethylene polypropylene copolymer is inferior to vinylidenefluoride-tetrafluoroethylene-polypropylene terpolymer in terms of a vulcanization characteristic. However, iodine-containing or bromine-containing monomer is copolymerized with the polymer so that an organic peroxide can be vulcanized. Hence, vulcanization of tetrafluoroethylene-polypropylene copolymer becomes feasible.

Desirable proportions of copolymerization of tetrafluoroethylene-polypropylene copolymer comprise 40 to 70 mol. % tetrafluoroethylene, and 30 to 60 mol. % polypropylene.

As a filler for reinforcing purpose, 20 to 70 parts by weight of carbon black, talc, wollastonite, or Mistron Paper is preferably added to 100 parts by weight of rubber feedstock. Since silica and clay are acidic and cause delay in vulcanization, they are not preferable.

An organic peroxide is used as a vulcanizing agent. More specifically, dicumyl peroxide, 2,5-dimethyl-2,5-di-(t-butylperoxy) hexane, benzoyl peroxide, or 1,3-bis-(t-butylperoxy)-diisopropylbenzene is preferably added in an amount of 0.5 to 10 parts by weight to 100 parts by weight of rubber feedstock. In the case of vinylidenefluoride-tetrafluoroethylene-polypropylene terpolymer, polyamine vulcanization or polyol vulcanization is a possible alternative to peroxide vulcanization by an organic peroxide.

Unsaturated multifunctional compounds are used as a vulcanizing agent. More specifically, polyallyl compounds such as triallyl isocyanurate or triallyl cyanurate, or methacrylate compounds such as trimethylolpropanetrimethacrylate are preferably added in an amount of 0.5 to 10 parts by weight to 100 parts by weight of rubber feedstock.

In the case of vinylidenefluoride-tetrafluoroethylene-polypropylene terpolymer, hydrides and oxides, such as those of magnesium, calcium, lead, and zinc, can be mentioned as di-metal-hydride or di-metal-oxide to be used as a vulcanizing agent. Preferably, the hydride or oxide is added in an amount of 1 to 20 parts by weight to 100 parts by weight of rubber feedstock.

In the case of vinylidenefluoride-tetrafluoroethylene-polypropylene terpolymer, an organic onium compound to be added as a vulcanizing agent promotes reaction for removing hydrogen fluoride from rubber during vulcanization, thus effecting smooth vulcanization of rubber. Particularly, fatty acid quaternary ammonium hydrogensulfate having a carbon number of 1 through 20 is preferable. More specifically, there can be mentioned tetrabutylammonium hydrogensulfate, tetramethylammonium hydrogensulfate, tetraethylammonium hydrogensulfate, tridecylmethylammonium hydrogensulfate, or trimethylbenzylammonium hydrogensulfate. Preferably, the hydrogensulfate is added in an amount of 0.3 to 5 parts by weight to 100 parts by weight of rubber feedstock.

In relation to the hardness of a rubber material composition according to the present invention, the spring hardness measured by a duro-meter A scale preferably falls within a range of 60 to 90, in terms of a sealing and follow-up property obtained when the rubber material composition is applied to the contact seal device. If the spring hardness assumes a value of less than 60, particularly when the rubber composition has been applied to a contact seal device, the lip section 65b of the contact seal device becomes deformed to a greater extent than required, and a result frictional resistance increases. This increases frictional force at the time of movement of the slider or the contact seal device, and bearing torque increases eventually. In contrast, when the spring hardness exceeds a value of 90, rubber elasticity decreases, thereby deteriorating a follow-up characteristic or sealing characteristic of the lip section 65b, as described previously. When the contact seal device is used in an environment rich in extraneous matter, the contact seal device is susceptible-to disparities in life. In order to make the degree of deformation or rubber elasticity of the lip section 65b particularly preferable, the spring hardness of the seal main body 6 is set so as to fall within a range of 70 to 80. In order to cause the contact seal device to quickly follow rotational movement and to prevent occurrence of damage to the lip section 65b, the seal main body 66 must have a tensile breaking elongation of 200% or more and a tensile breaking strength of 13 Mpa or more as a mechanical strength, along with the above-described hardness.

The rubber seal device 65 can be manufactured in accordance with a method of manufacturing a rubber seal device having a related-art reinforcing member. The reinforcing member 67 (e.g., an SECC core) having an adhesive baked thereon previously is bonded to the rubber by use of a metal frame through galvanization. As a more specific example of an adhesive, a silicon-based adhesive containing a silane coupling agent having an amino or vinyl group is most preferable.

EXAMPLE

The present invention will now be described in further detail by reference to examples and a comparative example. The present invention is not limited to the examples.

Examples 1 through 3, and Comparative Example 1

As shown in Table 7, rubber material, a crosslinking agent, a vulcanizing accelerator, and a reinforcing agent were formulated, and formed into the shape of a sheet or contact rubber seal device.

TABLE 7

RECIPE (PARTS BY WEIGHT)

| COMPOUNDING AGENT | Example 1 | Example 2 | Example 3 | COMPARATIVE EXAMPLE 1 |
|---|---|---|---|---|
| RUBBER FEEDSTOCK: VINYLIDENEFLUORIDE-TETRAFLUOROETHYLENE-POLYPROPYLENE TERPOLYMER (WITH VULCANIZING ACCELERATOR, 2 TO 5 mol. % OF VINYLIDENE FLUORIDE) (AFLAS SP, ASAHI GLASS COMPANY) | 100 | | | |
| RUBBER FEEDSTOCK: VINYLIDENEFLUORIDE-TETRAFLUOROETHYLENE-POLYPROPYLENE TERPOLYMER (WITH VULCANIZING ACCELERATOR, 30 mol. % VINYLIDENE FLUORIDE) (AFLAS MZ201, ASAHI GLASS COMPANY) | | 100 | | |
| RUBBER FEEDSTOCK: TETRAFLUOROETHYLENE-POLYPROPYLENE COPOLYMER (AFLAS 150P, ASAHI GLASS COMPANY) | | | 100 | |
| RUBBER FEEDSTOCK: VINYLIDENEFLUORIDE-HEXAFLUOROPROPYLENE COPOLYMER (DIEL G-801, DAIKINN INDUSTRIES LTD.) | | | | 100 |
| REINFORCING AGENT: MT | 30 | 30 | 30 | 20 |

TABLE 7-continued

RECIPE (PARTS BY WEIGHT)

| COMPOUNDING AGENT | Example 1 | Example 2 | Example 3 | COMPARATIVE EXAMPLE 1 |
|---|---|---|---|---|
| CARBON BLACK (THERMAX N-990, R. T. VANDERBILT CO., INC.) | | | | |
| CROSSLINKING AGENT: 1,3-BIS(t-BUTYLPEROXY)-DIISOPROPYLBENZEN (PERBUTYL-P, NOF CORPORATION) | 1 | | 1 | 1.5 |
| VULCANIZING ACCELERATOR: MgO (KYOWAMAG 30, KYOWA CHEMICAL INDUSTRY CO., LTD. | 3 | 3 | | |
| VULCANIZING ACCELERATOR: Ca(OH)$_2$ (RHENOFIT CF, RHEIN CHEMIE) | 6 | 3 | | |
| VULCANIZING ACCELERATOR: TRIALLYISOCYANURATE (TAIC, NIPPON KASEI CHEMICAL CO., LTD) | 3 | | 5 | 4 |
| VULCANIZING ACCELERATOR: SODIUM STEARATE (SODIUM STEARATE, WAKO PURE CHEMICAL INDUSTRIES LTD.) | | | 1 | |

(1) Masticating Process

Materials other than the crosslinking agent and vulcanizing accelerator were charged into a Banbury mixer, and the materials were masticated at a temperature of 800° C.

(2) Kneading Process

The thus-masticated material was taken out of the Banbury mixer and charged into two rollers for rubber kneading purposes. The vulcanizing agent and the cross-linking agent were charged into the material while the rollers were being controlled to a temperature of 50° C. After having been cut until attaining evenness, the material was made in the shape of a sheet.

(3) Vulcanizing Process, and Vulcanization Bonding Process

A sheet vulcanizing die assembly having a thickness of 2 mm was attached to a hot press heated up to 170° C. The sheet prepared through the kneading process was placed on the die assembly and heated for 20 minutes, whereby there was produced a vulcanized rubber sheet (i.e., a side seal member) measuring 150 mm long, 150 mm wide, and 2 mm thick.

The contact rubber seal device was manufactured, by means of placing a SECC core having an adhesive baked thereon previously in a die assembly assuming a desired geometry, pouring the rubber sheet into the core, and heating the core and the rubber sheet such that they are bonded together through vulcanization. Requirements (i.e., secondary vulcanization requirements) for manufacturing the rubber seal device were as follows:

Example 1: 200° C., 4 hours

Example 2: 230° C., 24 hours

Example 3: 200° C., 4 hours

Comparative Example 1: 180° C., 4 hours

Physical Property Tests

The rubber sheets were subjected to a hardness test, a tensile test, and measurement of volume change, which are described below.

(1) Hardness Test

Each of the sheets produced through the vulcanizing process was punched into the shape of specimen JIS3. Three specimens thus punched were subjected to measurement of hardness (HD$_A$) in accordance with JISK6301 while being stacked.

(2) Tensile Test

JIS3 specimens consisting of the rubber sheets were subjected to tensile teat by moans of a universal testing machine, thereby measuring the tensile breaking strength and tensile breaking elongation of the specimens.

(3) Volume Change

JIS3 specimens had been immersed in a soluble-type synthetic cutting coolant (Yushiroken Synthetic #660, Yushiro Chemical Industry Co., Ltd.) diluted to a concentration to be actually employed (diluted with water up to 20-fold), at 70° C. for one week. Subsequently, the rate of volume change was measured. A volume change was determined through comparison between the volume of each of the specimens before immersion and the volume of the specimen after immersion.

Table 8 shows test and measurement results. It is seen that the rubber sheets according to Examples involve small volume changes and have high resistance to the soluble-type synthetic cutting coolant. As the molar ratio of vinylidene fluoride decreases, a volume change also becomes smaller. In relation to the sheet that has been described in connection with Example 3 and does not contain any vinylidene fluoride, it turns out that the sheet undergoes substantially no expansion even in the soluble-type synthetic cutting coolant.

TABLE 8

COMPARISON OF PHYSICAL PROPERTIES

|  | Example 1 | Example 2 | Example 3 | Comparative Example 1 |
|---|---|---|---|---|
| Hardness/HD$_A$ | 76 | 74 | 74 | 69 |
| Tensile Fracture Strength, MPa | 18.2 | 13.7 | 20.9 | 20.9 |
| Tensile Fracture Elongation, % | 220 | 210 | 260 | 460 |
| Volume Change, % | +1.2 | +3.0 | +0.3 | +5.3 |

Bearing Rotation Test

One contact rubber seal device was attached to either end of a test bearing (Bearing No. 6305; ID of 25 mm; OD of 62 mm; and WD of 17 mm). Further, one gram of grease was filled into the test bearing, and the bearing was continuously rotated under the following conditions. The time that elapsed before oscillation of the bearing reaches ten times that observed in the initial phase of rotation was measured.

Test Temperature: 80° C. (outer ring)
Rotating Speed: 300 min$^{-1}$
Load (Fr): 100 N
Clearance between a lip section and an inner ring: negative clearance (a region that can be fastened: 0.1 mm)
Test Environment: The 20-fold diluted soluble-type synthetic cutting coolant used in measurement of a volume change was successively supplied to one end surface of the rubber seal device at a rate of 500 ml/min.

Measurement results are provided in Table 9 as relative values while the time required in Comparative Example 1 is taken as one. It is seen that the continuity of sealing performance is improved significantly as compared with Comparative Example 1. The results provided in Table 9 are tied to results of measurement of volume changes provided in Table 8.

TABLE 9

BEARING ROTATION TEST RESULTS

|  | Example 1 | Example 2 | Example 3 | Comparative Example 1 |
|---|---|---|---|---|
| Time that elapses before oscillation of a bearing reaches 10 times an initial value | 2.7 | 2.2 | 3.4 | 1 |

As has been described, according to the present invention, the rubber seal device of the rolling bearing is formed integrally from a rubber composition containing fluoro rubber selected from vinylidenefluoride-tetrafluoroethylene-polypropylene terpolymer and tetrafluoroethylene-polypropylene copolymer, and a reinforcing member. As a result, the rubber seal device has superior chemical resistance to amine compounds. Even when the rubber seal device is employed in an environment in which the device is exposed to a soluble-type synthetic cutting coolant or automobile coolant, either containing a large quantity of amine-based additive, occurrence of a problem, such as expansion of the lip section or a drop in the strength of the lip section, can be minimized. A high sealing characteristic is maintained, and the life of a rolling bearing can be extended.

As is evident from the foregoing description, a contact rubber seal device according to the present invention can be imparted with high resistance to a chemical, such as a soluble-type synthetic cutting coolant containing a large amount of amine-based additive. Even when the contact rubber seal device is used in an environment in which the device is splashed with a chemical, there is yielded an advantage of ability to ensure the long life of the device.

As has been described, in relation to a bearing for use in a water pump according to the present invention, elastic material of a seal device is formed from a vulcanizable fluoro rubber composition containing vinylidenefluoride-tetrafluoroethylene-polypropylene terpolymer or from a vulcanizable fluoro rubber composition containing tetrafluoroethylene-polypropylene copolymer. Hence, the seal device has superior LLC resistance and can make use of superior sealing performance over a long period of time. Steam having originated from an impeller and passed through a mechanical seal is prevented from entering the bearing, and hence stable performance of the bearing can be ensured.

As has been described, according to the present invention, the rubber seal device of the rolling bearing is formed integrally from a rubber composition containing fluoro rubber selected from vinylidenefluoride-tetrafluoroethylene-polypropylene terpolymer and tetrafluoroethylene-polypropylene copolymer, and a reinforcing member. As a result, the rubber seal device has superior chemical resistance to amine compounds. Even when the rubber seal device is employed in an environment in which the device is exposed to a soluble-type synthetic cutting coolant or automobile coolant, either containing a large quantity of amine-based additive, occurrence of a problem, such as expansion of the lip section or a drop in the strength of the lip section, can be minimized. A high sealing characteristic is maintained, and the life of a rolling bearing can be extended.

while there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A bearing apparatus comprising:
    a first member;
    a second member;
    rolling elements rotatably interposed between the first and second members to thereby effect relative movement therebetween; and
    a seal device for sealing at least a portion of a clearance defined between the first and second members, the seal device comprising a rubber portion made of fluoro rubber composition containing at least one of vinylidenefluoride-tetrafluoroethylene-polypropylene terpolymer and tetrafluoroethylene-polypropylene copolymer.

2. The bearing apparatus according to claim 1, wherein the bearing apparatus is a linear motion apparatus, the first member is a guide rail or screw shaft of the linear motion apparatus, and the second member is a slider or a nut of the linear motion apparatus.

3. The bearing apparatus according to claim 2, wherein proportions of copolymerization of tetrafluoroethylene-polypropylene copolymer comprise:

tetrafluoroethylene in the range of 30 to 60 mol. %, and polypropylene in the range of 30 to 60 mol. %.

4. The bearing apparatus according to claim 2, wherein proportions of copolymerization of tetrafluoroethylene-polypropylene copolymer comprise:

tetrafluoroethylene in the range of 20 to 80 mol. %, and polypropylene in the range of 20 to 80 mol. %.

5. The bearing apparatus according to claim 2, wherein proportions in which three monomers are to be polymerized comprise:

vinylidene fluoride in the range of 1 to 30 mol. %;

tetrafluoroethylene in the range of 10 to 60 mol. %; and polypropylene in the range of 10 to 60 mol. %.

6. The bearing apparatus according to claim 1, wherein proportions in which three monomers are to be polymerized comprise:

vinylidene fluoride in the range of 1 to 30 mol. %;

tetrafluoroethylene in the range of 40 to 70 mol. %; and polypropylene in the range of 30 to 60 mol. %.

7. The bearing apparatus according to claim 1, wherein proportions in which three monomers are to be polymerized comprise:

vinylidene fluoride in the range of 2 to 5 mol. %;

tetrafluoroethylene in the range of 40 to 70 mol. %; and polypropylene in the range of 30 to 60 mol. %.

8. The bearing apparatus according to claim 1, wherein proportions of copolymerization of tetrafluoroethylene-polypropylene copolymer comprise:

tetrafluoroethylene in the range of 40 to 70 mol. %, and, polypropylene in the range of 30 to 60 mol. %.

9. The bearing apparatus according to claim 1, wherein said at least one of vinylidenefluoride-tetrafluoroethylene-polypropylene terpolymer and tetrafluoroethylene-polypropylene copolymer is vulcanizable.

10. The bearing apparatus according to claim 1, wherein the bearing apparatus is a water pump bearing, the first member is an outer ring secured on a casing of the water pump bearing, the second member is a rotary shaft having a drive section at one end thereof and an impeller at the other end thereof, and the seal device is fastened to one end of the outer ring.

11. The bearing apparatus according to claim 1, wherein the bearing apparatus is a rolling bearing, the first member is an outer ring of the rolling bearing, and the second member is an inner ring of the rolling bearing.

12. The bearing apparatus according to claim 11, wherein said seal device further comprises;

a reinforcing member integrally formed with the rubber portion.

* * * * *